(12) United States Patent
Ito et al.

(10) Patent No.: US 10,291,835 B2
(45) Date of Patent: May 14, 2019

(54) INFORMATION PROCESSING APPARATUS, IMAGING APPARATUS, INFORMATION PROCESSING METHOD, AND IMAGING SYSTEM

(71) Applicant: SONY CORPORATION, Tokyo (JP)

(72) Inventors: Ryogo Ito, Tokyo (JP); Shunsuke Katsumata, Kanagawa (JP); Kazuma Akamatsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 298 days.

(21) Appl. No.: 14/571,839

(22) Filed: Dec. 16, 2014

(65) Prior Publication Data

US 2015/0189151 A1    Jul. 2, 2015

(30) Foreign Application Priority Data

Dec. 27, 2013  (JP) .................................. 2013-271106

(51) Int. Cl.
| | |
|---|---|
| *H04N 7/00* | (2011.01) |
| *H04N 5/232* | (2006.01) |
| *H04N 13/221* | (2018.01) |

(52) U.S. Cl.
CPC ..... *H04N 5/23203* (2013.01); *H04N 5/23238* (2013.01); *H04N 13/221* (2018.05)

(58) Field of Classification Search
CPC ...................... H04N 7/185; G06T 2207/30232
USPC .................................................. 348/14.05, 13
See application file for complete search history.

(56) References Cited

U.S. PATENT DOCUMENTS

| | | | | |
|---|---|---|---|---|
| 5,881,321 | A * | 3/1999 | Kivolowitz ............ | H04N 5/222 348/61 |
| 2007/0103548 | A1* | 5/2007 | Carter .................. | H04M 11/025 348/143 |
| 2007/0199076 | A1* | 8/2007 | Rensin .............. | H04L 29/06027 726/27 |
| 2010/0149337 | A1* | 6/2010 | Porcino .............. | H04N 5/23203 348/159 |
| 2012/0116548 | A1* | 5/2012 | Goree ................... | A61B 5/1118 700/90 |
| 2012/0249802 | A1* | 10/2012 | Taylor ..................... | G06T 7/292 348/169 |
| 2013/0271603 | A1* | 10/2013 | Follesa .................... | H04N 7/18 348/143 |
| 2014/0218517 | A1* | 8/2014 | Kim .................... | H04L 12/2818 348/143 |
| 2015/0022674 | A1* | 1/2015 | Blair .................. | H04N 5/23222 348/207.1 |
| 2015/0133051 | A1* | 5/2015 | Jamal-Syed ........ | H04M 1/7253 455/41.2 |

FOREIGN PATENT DOCUMENTS

JP        H08-331434 A        12/1996

* cited by examiner

*Primary Examiner* — Farzana Hossain
(74) *Attorney, Agent, or Firm* — Chip Law Group

(57) ABSTRACT

There is provided an information processing apparatus including: an image specification condition setting section that sets an image specification condition for an imaging apparatus; and an image specification instruction section that issues an image specification instruction to the imaging apparatus when the image specification condition is satisfied by the imaging apparatus.

14 Claims, 19 Drawing Sheets

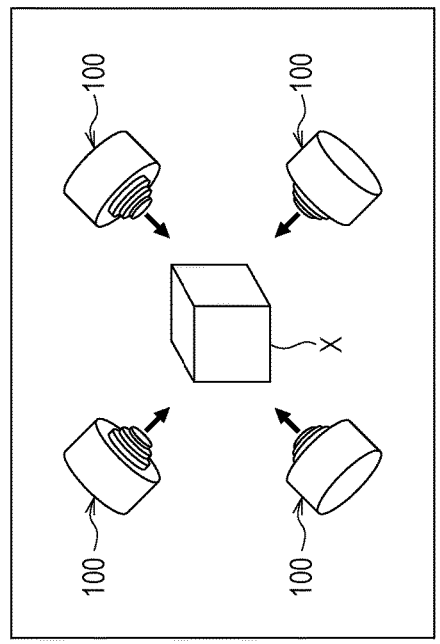
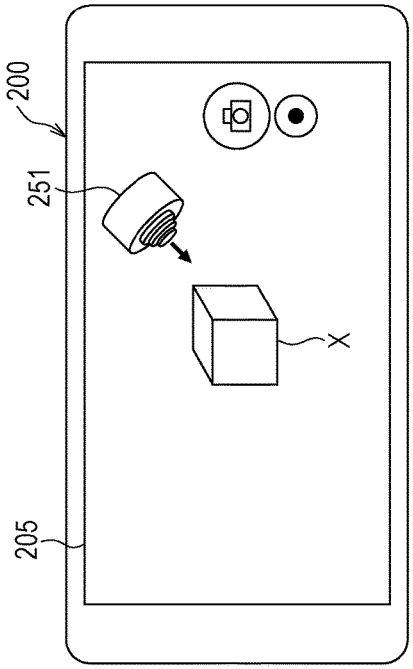
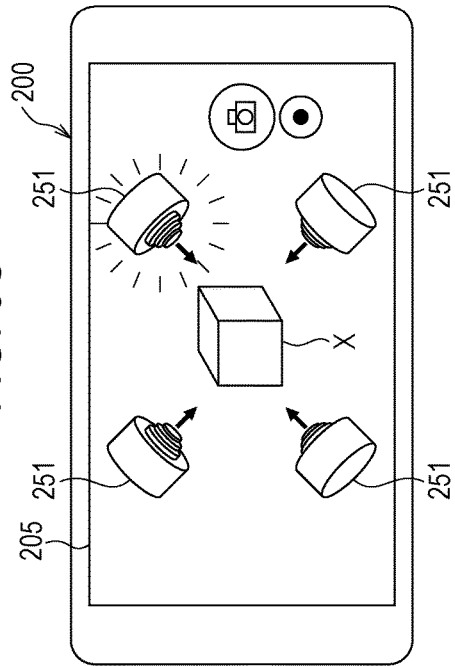

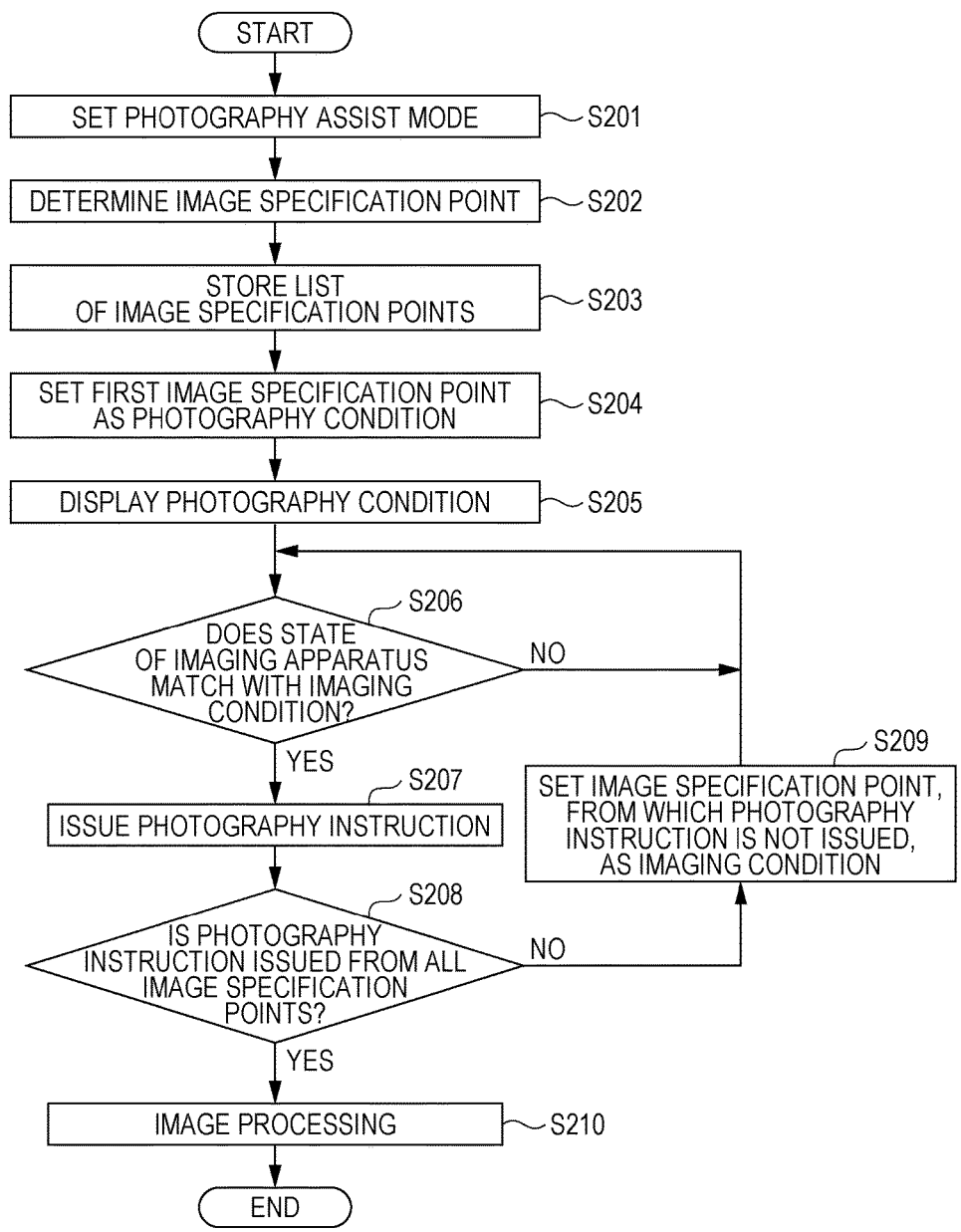

FIG. 15

[TAG DATA 1]

| PHOTOGRAPHY ASSIST TYPE | 360 DEGREE PANORAMA / OPTICAL AXIS TILT OF 90 DEGREES |
|---|---|
| POSITION OF PHOTOGRAPHY POINT | UPPER LEFT |
| TAGGING TIME | 11/21 12:32:56 |
| TIME FROM START OF MOVING IMAGE RECORDING | 36 SECONDS |

[TAG DATA 2]

| PHOTOGRAPHY ASSIST TYPE | 360 DEGREE PANORAMA / OPTICAL AXIS TILT OF 90 DEGREES |
|---|---|
| POSITION OF PHOTOGRAPHY POINT | LEFT |
| TAGGING TIME | 11/21 12:33:02 |
| TIME FROM START OF MOVING IMAGE RECORDING | 42 SECONDS |

[TAG DATA 3]

| PHOTOGRAPHY ASSIST TYPE | 360 DEGREE PANORAMA / OPTICAL AXIS TILT OF 90 DEGREES |
|---|---|
| POSITION OF PHOTOGRAPHY POINT | LOWER LEFT |
| TAGGING TIME | 11/21 12:33:22 |
| TIME FROM START OF MOVING IMAGE RECORDING | 62 SECONDS |

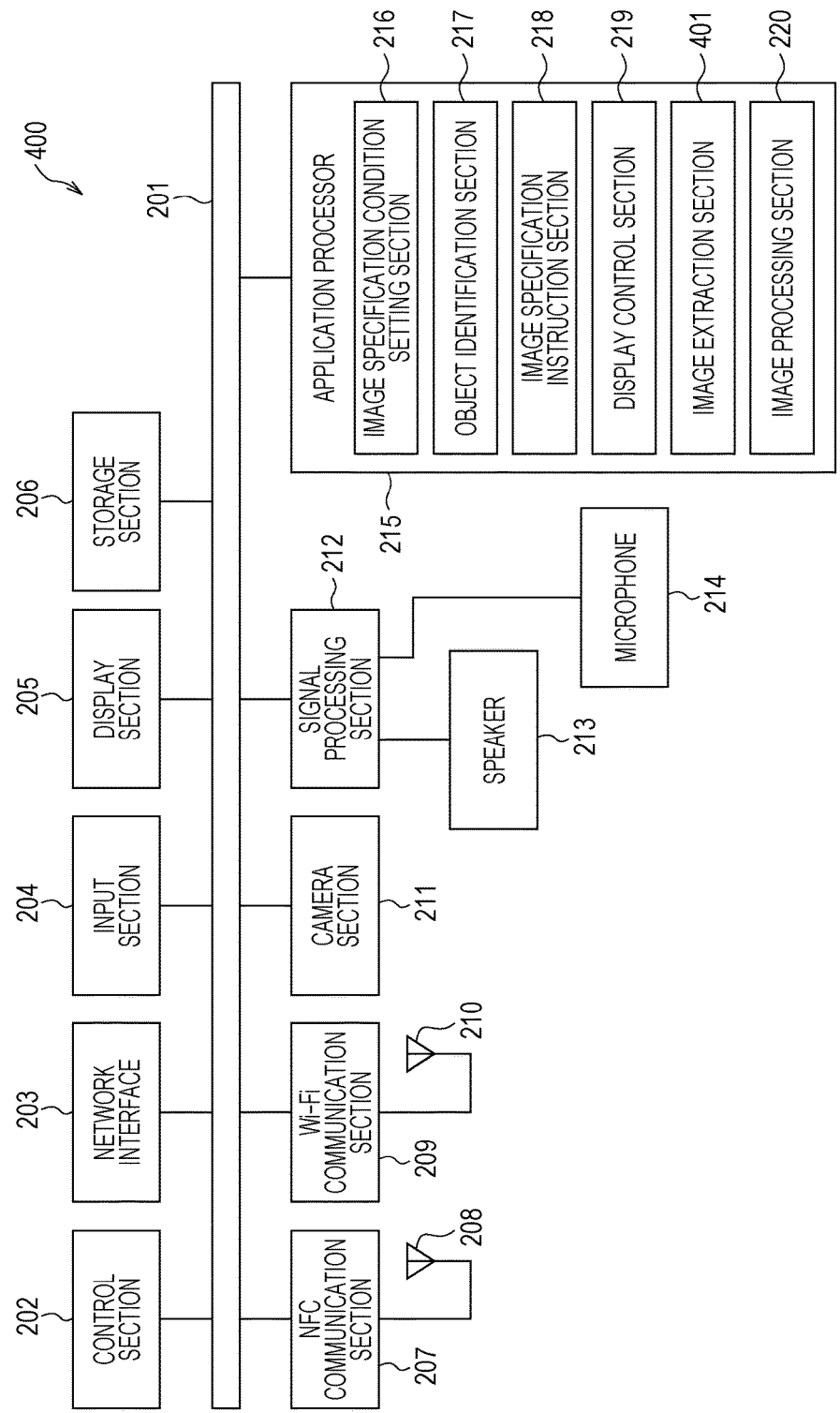

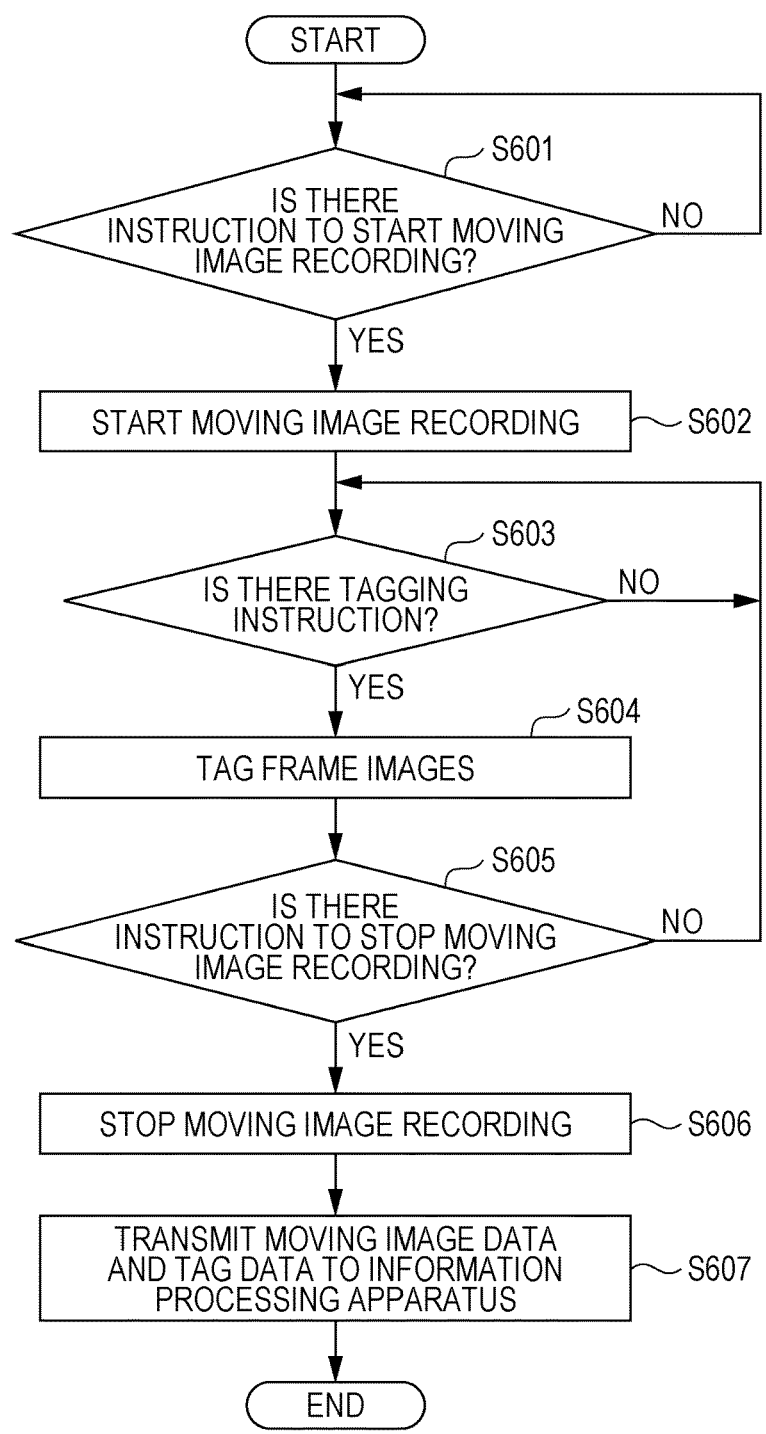

INFORMATION PROCESSING APPARATUS, IMAGING APPARATUS, INFORMATION PROCESSING METHOD, AND IMAGING SYSTEM

CROSS REFERENCE TO RELATED APPLICATIONS

This application claims the benefit of Japanese Priority Patent Application JP 2013-271106 filed Dec. 27, 2013, the entire contents of which are incorporated herein by reference.

BACKGROUND

The present technology relates to an information processing apparatus, an imaging apparatus, an information processing method, an information processing program, and an imaging system. The related art has proposed video camera apparatuses that have a remote control function. For example, there has been proposed a video camera apparatus that performs photography on the basis of control data transmitted from a remote controller through wireless communication and transmits a photographed image to a remote controller side (Japanese Unexamined Patent Application Publication No. 8-331434).

Further, there has been proposed a system that performs remote photography control of a digital camera by performing wireless communication with the digital camera and using an information processing apparatus (smartphone, mobile phone terminal, or the like) equipped with an application that has a function capable of remote photography control.

SUMMARY

In recent years, as processing performance of the information processing apparatus increases and various photography methods and photography techniques are newly developed, there has been a demand for the information processing apparatus to establish a link between the apparatuses for obtaining images or perform assist based on the link.

According to the present technology, it is desirable to provide an information processing apparatus, an imaging apparatus, an information processing method, an information processing program, and an imaging system capable of easily assisting the imaging apparatus in acquiring images and the like through a link between apparatuses.

According to a first embodiment of the present technology, there is provided an information processing apparatus including: an image specification condition setting section that sets an image specification condition for an imaging apparatus as a different apparatus; and an image specification instruction section that determines whether or not the image specification condition is satisfied by the imaging apparatus and issues an image specification instruction to the imaging apparatus when the image specification condition is satisfied.

According to a second embodiment of the present technology, there is provided an imaging apparatus including: an imaging section that receives light through an optical system and generates an image; a control section that performs image specification processing on the basis of an image specification instruction which is transmitted from an information processing apparatus as a different apparatus; and a communication section that communicates with the information processing apparatus.

According to a third embodiment of the present technology, there is provided an information processing method including: setting an image specification condition for an imaging apparatus as a different apparatus; and determining whether or not the image specification condition is satisfied by the imaging apparatus and issuing an image specification instruction to the imaging apparatus when the image specification condition is satisfied.

According to a fourth embodiment of the present technology, there is provided an information processing program causing a computer to execute an information processing method including: setting an image specification condition for an imaging apparatus as a different apparatus; and determining whether or not the image specification condition is satisfied by the imaging apparatus and issuing an image specification instruction to the imaging apparatus when the image specification condition is satisfied.

According to a fifth embodiment of the present technology, there is provided an imaging system including: an imaging apparatus that includes an imaging section that receives light through an optical system and generates an image, a control section that performs image specification processing on the basis of an image specification instruction which is transmitted from an information processing apparatus as a different apparatus, and a communication section that communicates with the information processing apparatus; and the information processing apparatus that includes an image specification condition setting section that sets an image specification condition for the imaging apparatus as a different apparatus, and an image specification instruction section that determines whether or not the image specification condition is satisfied by the imaging apparatus and issues an image specification instruction to the imaging apparatus when the image specification condition is satisfied.

According to the embodiments of the present technology, it is possible to establish a link between the imaging apparatus and the information processing apparatus and easily assist the imaging apparatus in acquiring images and the like.

BRIEF DESCRIPTION OF DRAWINGS

FIG. 8A is a diagram illustrating an imaging apparatus state in a fourth example of photography assist and image processing;

FIG. 8B is a first example of a user interface which is displayed in the information processing apparatus;

FIG. 8C is a second example of the user interface which is displayed in the information processing apparatus;

FIG. 11 is a flowchart illustrating a flow of processing performed by the information processing apparatus;

FIG. 15 is a diagram illustrating an example of tag data;

FIG. 16 is a block diagram illustrating a configuration of an information processing apparatus according to the second embodiment;

FIG. 19 is a flowchart illustrating a flow of tagging processing performed by the imaging apparatus according to the second embodiment.

DETAILED DESCRIPTION OF EMBODIMENTS

Hereinafter, embodiments of the present technology will be described with reference to the accompanying drawings.

Figure 1:
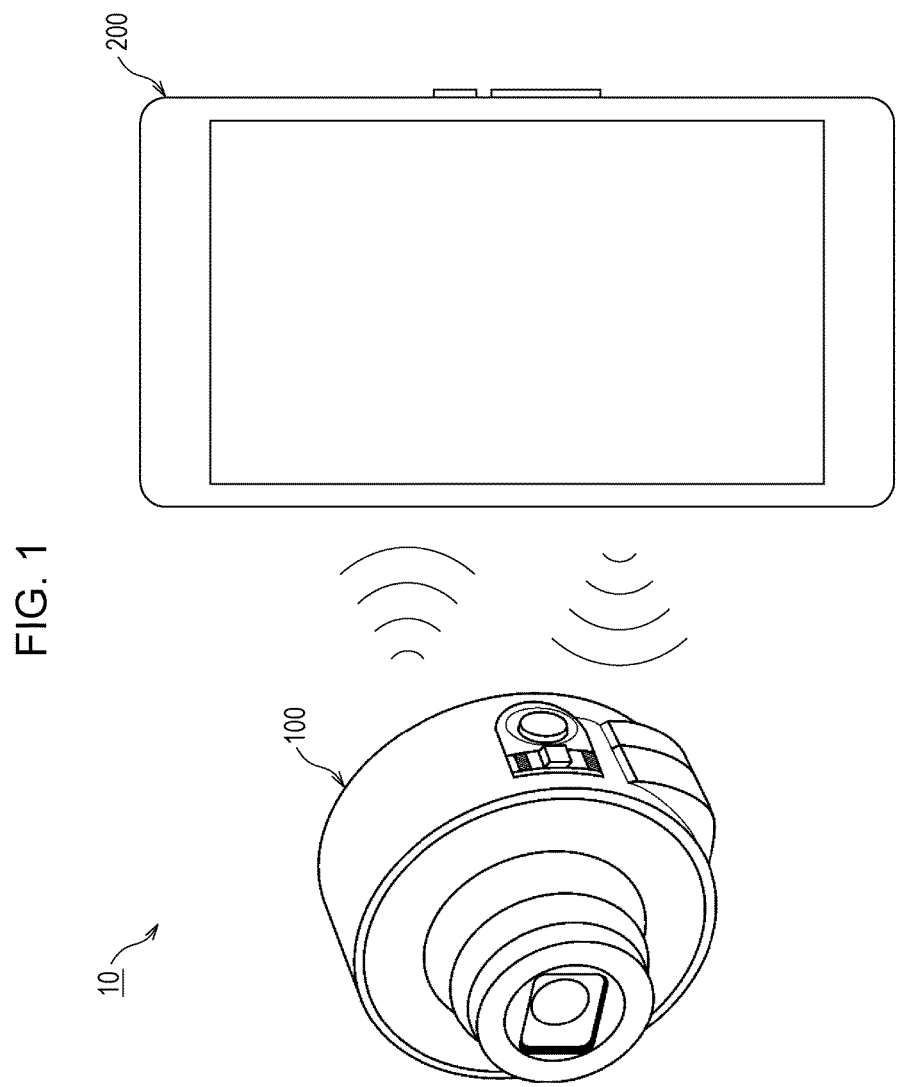
FIG. 1 is a first diagram illustrating an overview of an imaging system according to the present technology.

Description will be given in the following order:
1. First Embodiment;
1-1. Configuration of Imaging System;
1-2. Configuration of Imaging Apparatus;
1-3. Configuration of Image Processing Apparatus;
1-4. Specific Example of Photography Assist and Image Processing;
1-4-1. First Example of Photography Assist and Image Processing;
1-4-2. Second Example of Photography Assist and Image Processing;
1-4-3. Third Example of Photography Assist and Image Processing;
1-4-4. Fourth Example of Photography Assist and Image Processing;
1-4-5. Fifth Example of Photography Assist and Image Processing;
1-5. Processing of Imaging System;
1-5-1. Transmission Processing of Sensor Information Performed by Imaging Apparatus;
1-5-2. Processing in Information Processing Apparatus;
1-5-3. Image Specification Processing Performed by Imaging Apparatus;
2. Second Embodiment;
2-1. Configuration of Imaging System;
2-2. Configuration of Imaging Apparatus;
2-3. Configuration of Image Processing Apparatus;
2-4. Processing in Imaging System;
2-4-1. Transmission Processing of Sensor Information Performed by Imaging Apparatus;
2-4-2. Processing in Information Processing Apparatus;
2-4-3. Image Specification Processing Performed by Imaging Apparatus;
3. Modification Example 1. First Embodiment 1-1. Configuration of Imaging System First, an imaging system 10 according to the present technology will be described. FIG. 1 is a diagram illustrating an overview of the imaging system 10. The imaging system 10 includes an imaging apparatus 100 and an information processing apparatus 200. As the imaging apparatus 100, for example, there is a so-called digital camera. As the information processing apparatus 200, for example, there is a smartphone having a camera function. However, the imaging apparatus 100 and the information processing apparatus 200 are not limited to those. The imaging system 10 is formed by a link between the imaging apparatus 100 and the information processing apparatus 200. The imaging apparatus 100 and the information processing apparatus 200 perform non-contact communication with an adjacent apparatus, which has a function of performing near field communication (NFC) together, through NFC communication. The NFC communication function provided in the imaging apparatus 100 and the information processing apparatus 200 performs the NFC communication between apparatuses within a coverage area of radio waves by transmitting radio waves arriving at a short distance of about 3 cm to 10 cm from an NFC antenna.

When the information processing apparatus 200 is in the vicinity, the imaging apparatus 100 in a power OFF state is turned on and activated in response to the NFC communication. In addition, the imaging apparatus 100 performs wireless communication connection of wireless fidelity (Wi-Fi) in response to a request from the information processing apparatus 200, activates a predetermined application on the information processing apparatus 200 side, and executes a link function of the imaging apparatus 100 and the information processing apparatus 200.

In the imaging system 10 according to the present technology, a photography assist mode is executed. The mode assists in specifying an image in the imaging apparatus 100 by using the information processing apparatus 200 through the link between the imaging apparatus 100 and the information processing apparatus 200. The image specification is to specify an image (hereinafter referred to as a raw image) used in predetermined image processing which forms a single image or a plurality of images by using a plurality of images. In a first embodiment, in the image specification, an image, which is acquired by photography performed by the imaging apparatus 100, is set as a raw image.

In the photography assist, the imaging apparatus 100 is captured through a camera function of the information processing apparatus 200, and the imaging apparatus 100 is displayed in a live view which is displayed on a display section of the information processing apparatus 200. Then, in the live view, a user interface (UI) indicating a position, a direction, and a tilt of the imaging apparatus 100 appropriate for photography is displayed so as to recommend that a user adjust the imaging apparatus 100 to the position, the direction, and the tilt appropriate for photography.

Figure 2:
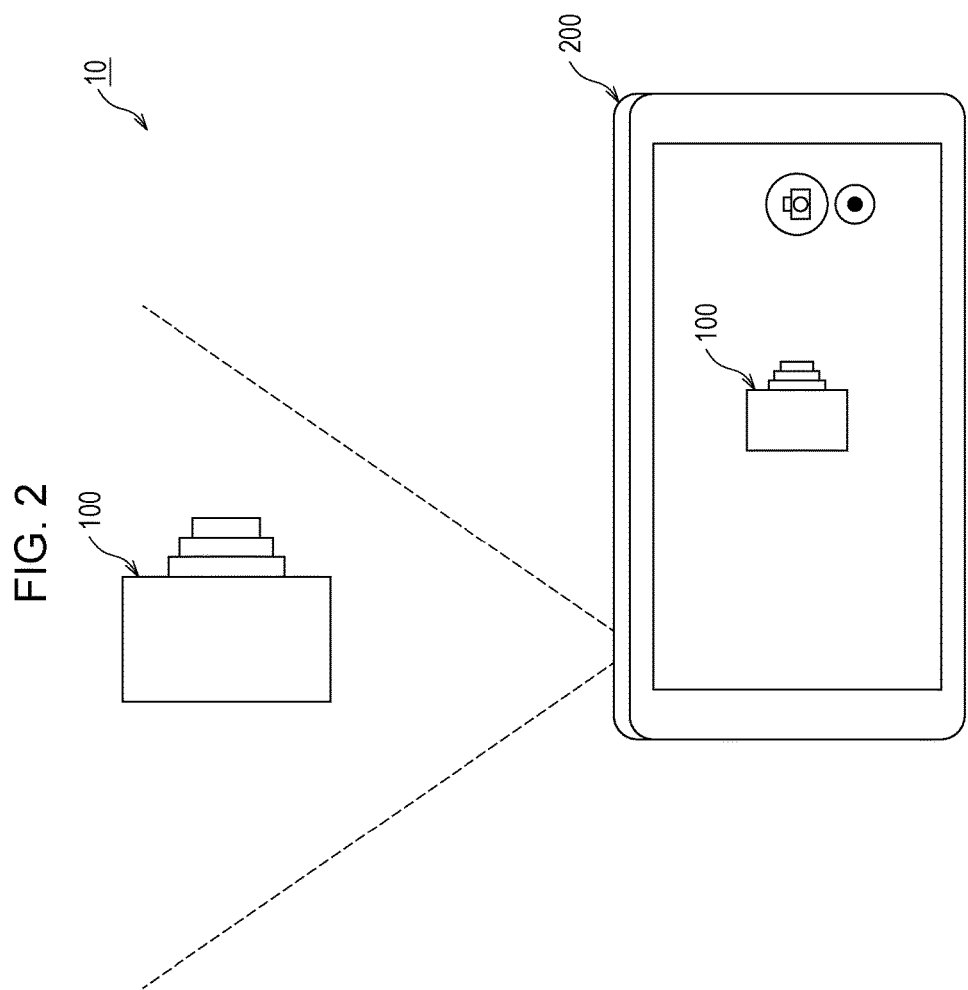
FIG. 2 is a second diagram illustrating an overview of the imaging system according to the present technology.

Accordingly, as shown in FIG. 2, the user captures the imaging apparatus 100, which performs photography, such that the apparatus is within an angle of view of a camera of the information processing apparatus 200, and moves the imaging apparatus 100 in accordance with the user interface displayed to be superposed upon the live view. For example, the user holds the information processing apparatus 200 with one hand, and holds the imaging apparatus 100 with the other hand. Then, while the imaging apparatus 100 is captured by the camera of the information processing apparatus 200, the imaging apparatus 100 is moved to be adjusted to the position, the direction, and the tilt appropriate for photography, in accordance with the user interface displayed on the live view. Subsequently, when the imaging apparatus 100 is adjusted to the position, the direction, and the tilt appropriate for photography, photography is automatically performed. It should be noted that specific contents of the photography assist and details of the user interface, and the like are will be described later.

1-2. Configuration of Imaging Apparatus

Figure 3:
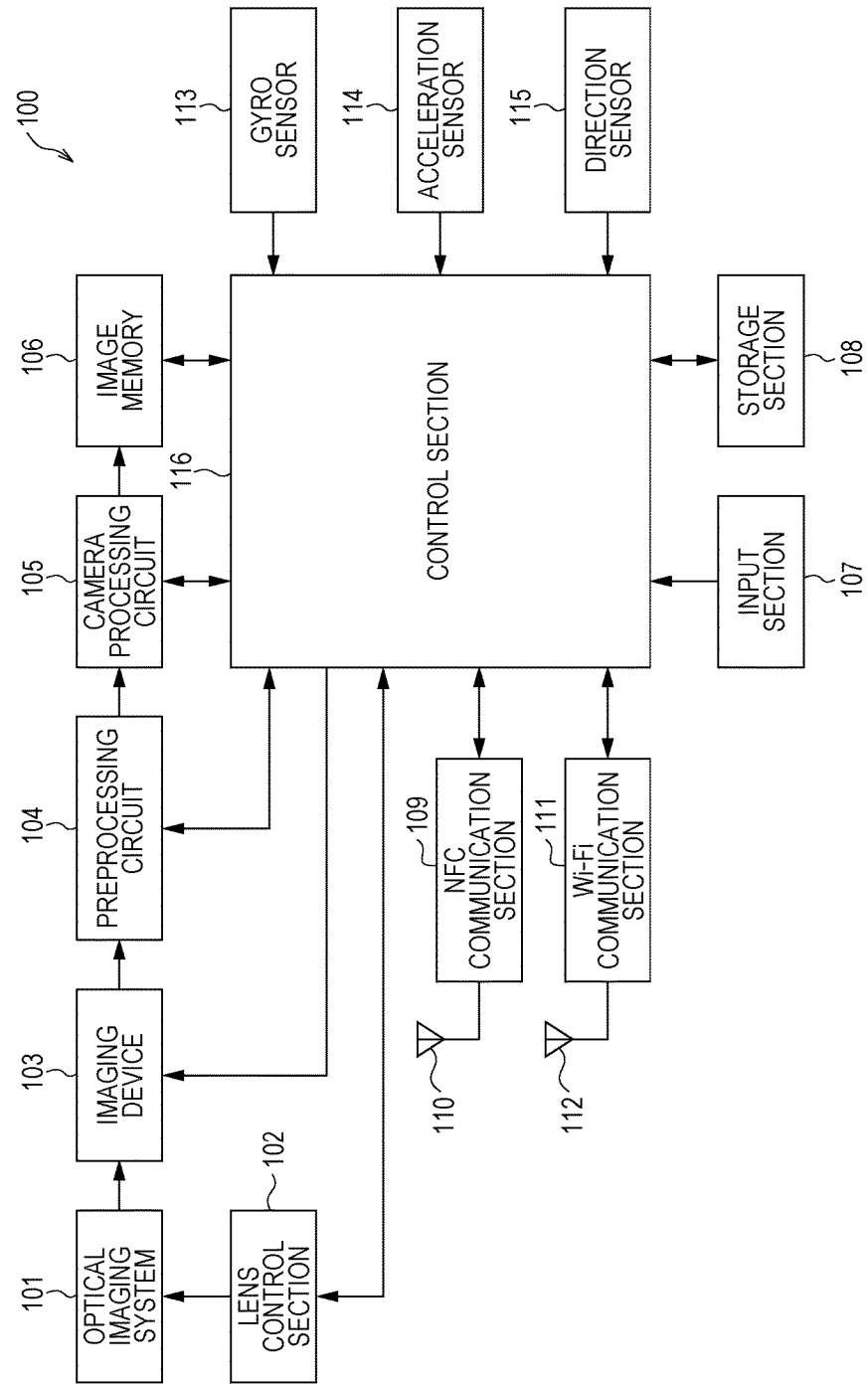
FIG. 3 is a block diagram illustrating a configuration of an imaging apparatus according to a first embodiment.

First, the imaging apparatus 100 constituting the imaging system 10 according to the first embodiment will be described. FIG. 3 is a block diagram illustrating a configuration of the imaging apparatus 100. The imaging apparatus 100 includes an optical imaging system 101, a lens control section 102, an imaging device 103, a preprocessing circuit 104, a camera processing circuit 105, an image memory 106, an input section 107, a storage section 108, an NFC communication section 109, an NFC antenna 110, a Wi-Fi communication section 111, a Wi-Fi antenna 112, a gyro sensor 113, an acceleration sensor 114, a direction sensor 115, and a control section 116.

The optical imaging system 101 includes a photography lens for concentrating light originating from a subject onto the imaging device 103, and a driving mechanism, a shutter mechanism, an iris mechanism, and the like for focusing or zooming by moving the photography lens. Those are driven by control of the lens control section 102. An optical image of the subject obtained through the optical imaging system 101 is formed on the imaging device 103.

The lens control section 102 controls operations of the driving mechanism, the shutter mechanism, the iris mechanism, and the like of the optical imaging system 101, in accordance with control performed by the control section 116. Thereby, an exposure time period (shutter speed), a diaphragm value (F number), and the like are adjusted.

The imaging device 103 converts light, which is incident from the subject, into an amount of electric charge, and outputs the amount as an analog imaging signal. The analog imaging signal, which is output from the imaging device 103, is output to the preprocessing circuit 104. As the imaging device 103, a charge coupled device (CCD), a complementary metal oxide semiconductor (CMOS), and the like are used.

The preprocessing circuit 104 performs sample holding and the like on the imaging signal, which is output from the imaging device 103, so as to satisfactorily hold a signal/noise (S/N) ratio through correlated double sampling (CDS) processing. Further, a gain is controlled through auto gain control (AGC) processing, and analog/digital (A/D) conversion is performed, thereby outputting a digital image signal. Such processing is performed in accordance with the control performed by the control section 116.

The camera processing circuit 105 performs signal processing on the image signal from the preprocessing circuit 104. The signal processing includes white balance adjustment processing, color correction processing, gamma correction processing, Y/C conversion processing, auto exposure (AE) processing, and the like.

The image memory 106 is a volatile memory, for example, a buffer memory which is constituted by a dynamic random access memory (DRAM). The image memory 106 temporarily stores image data on which predetermined processing is performed by the preprocessing circuit 104 and the camera processing circuit 105.

The input section 107 is formed of, for example, a power button for switching power on and off, a release button for issuing an instruction to start image recording, an operator for zoom adjustment, and the like. When an input is performed on the input section 107, a control signal corresponding to the input is generated, and is output to the control section 116. Then, the control section 116 performs control or arithmetic processing corresponding to the control signal.

The storage section 108 is, for example, a mass-storage medium such as a hard disk, a memory stick (registered trademark of Sony, Ltd.), and an SD memory card. For example, the image is stored in a state where the images are compressed in conformity of a standard of a joint photographic experts group (JPEG) or the like. Further, exchangeable image file format (EXIF) data is also stored to be associated with the image. The data includes information about the stored image and additional information such as an imaging date.

The NFC communication section 109 is an interface that performs non-contact communication with an external apparatus (the information processing apparatus 200 in the present technology or the like), which comes close, in cooperation with the NFC antenna 110, in accordance with the control performed by the control section 116. The NFC communication section 109 performs NFC communication with the external apparatus within a coverage area of radio waves by transmitting radio waves arriving at a short distance of about 3 cm to 10 cm from the NFC antenna 110. For example, the NFC communication section 109 transmits connection information (Wi-Fi Configuration) for performing automatic connection of Wi-Fi or android application record (AAR), in response to a check command issued from the external apparatus. The Wi-Fi Configuration includes a service set identifier (SSID) for Wi-Fi connection, a pass key (password key), and the like.

The Wi-Fi communication section 111 is an interface that performs wireless communication with the peripheral external apparatus in cooperation with the Wi-Fi antenna 112 in accordance with the control performed by the control section 116. For example, the Wi-Fi communication section 111 performs Wi-Fi authentication in response to a Wi-Fi connection request from the external apparatus, and performs processing of establishing the Wi-Fi communication connection with the external apparatus.

The gyro sensor 113 detects a velocity (angular velocity) of change of a rotation angle about a Z axis or an angular velocity about a Y axis when the imaging apparatus 100 is rotated, and outputs the velocity to the control section 116. The acceleration sensor 114 is, for example, a biaxial or triaxial acceleration sensor. The acceleration sensor 114 detects a magnitude of shaking, which is directly or indirectly applied to the imaging apparatus 100, as a speed of acceleration, and outputs the magnitude to the control section 116 as a shake signal.

The direction sensor 115 is a sensor that detects geomagnetism so as to measure a direction on earth, and outputs the measured direction to the control section 116. For example, the direction sensor 115 is a magnetic field sensor that includes a coil having two axes orthogonal to each other and magnetic resistance elements (MR elements) disposed on the centers of the axes.

The imaging apparatus 100 includes a gyro sensor 113, an acceleration sensor 114, and a direction sensor 115, and is able to constantly obtain information about the position, the direction, the tilt, and the like of the imaging apparatus 100.

The control section 116 includes a central processing unit (CPU), a random access memory (RAM), a read only memory (ROM), and the like. The ROM stores programs, which are read and operated by the CPU, and the like. The RAM is used as a work memory of the CPU. The CPU controls the entire imaging apparatus 100 by issuing commands and executing various kinds of processing in accordance with the programs stored in the ROM. The control section 116 performs processing of executing photography as image specification processing, on the basis of a photography instruction as an image specification instruction transmitted from the information processing apparatus 200. The image specification instruction transmitted from the information processing apparatus 200 will be described later.

In the present technology, the control section 116 performs processing of periodically transmitting information (hereinafter referred to as sensor information), which is obtained by the gyro sensor 113, the acceleration sensor 114, and the direction sensor 115, to the information processing apparatus 200. Further, the control section 116 operates respective sections of the imaging apparatus 100 in accordance with the image specification instruction transmitted from the information processing apparatus 200, thereby performing photography. Furthermore, the control section 116 performs processing of transferring the image, which is acquired by the photography, to the information processing apparatus 200.

In such a manner, the imaging apparatus 100 according to the first embodiment is formed. It should be noted that the imaging apparatus 100 may be a different apparatus, which has a camera function other than a digital camera, such as a mobile phone, a smartphone, a portable music player, and a tablet terminal.

1-3. Configuration of Image Processing Apparatus

Figure 4:
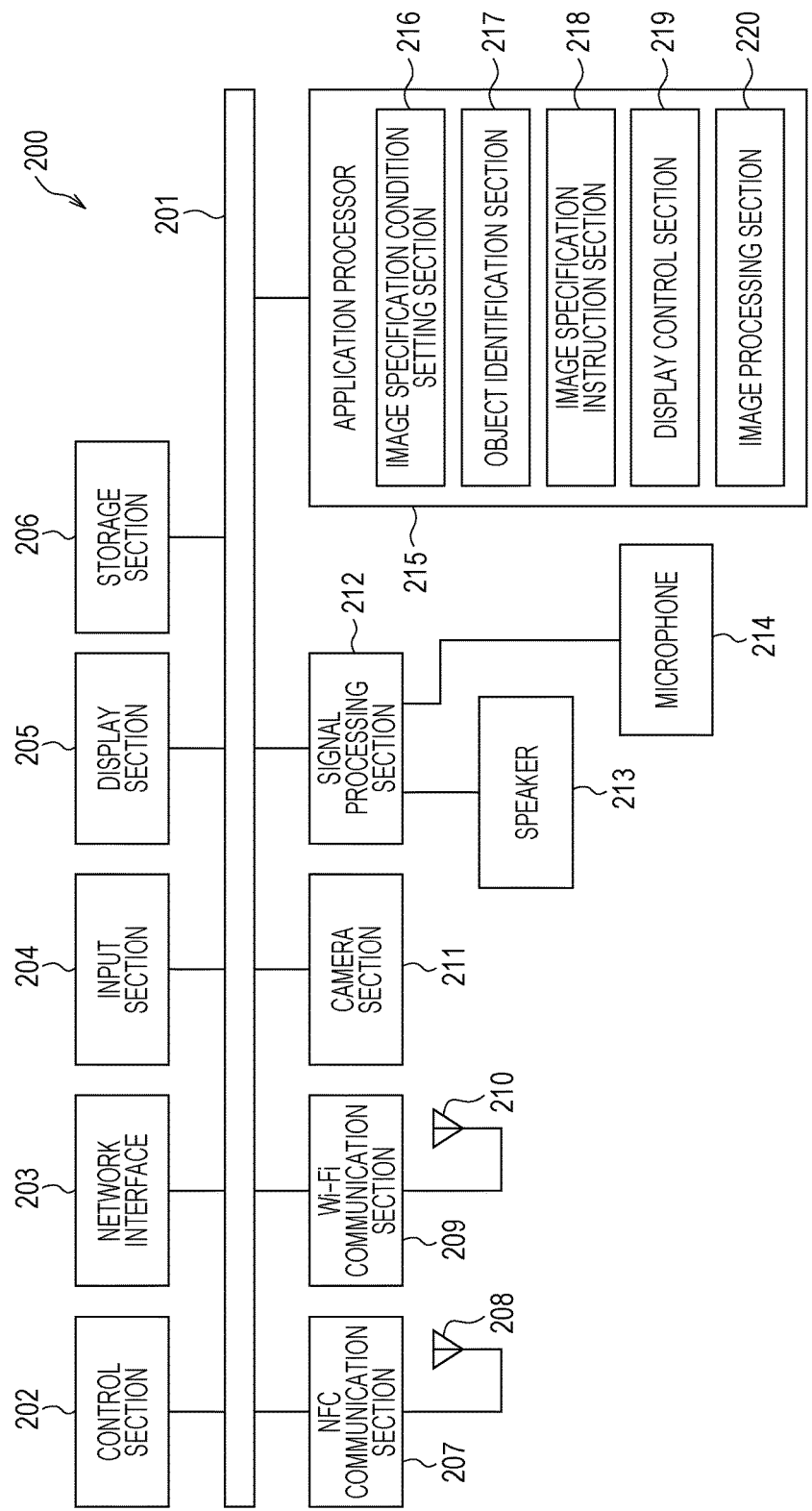
FIG. 4 is a block diagram illustrating a configuration of an information processing apparatus according to the first embodiment.

Next, a configuration of the information processing apparatus 200 constituting the imaging system 10 according to the first embodiment will be described. FIG. 4 is a block diagram illustrating a configuration of the information processing apparatus 200. The information processing apparatus 200 includes a data bus 201, a control section 202, a network interface 203, an input section 204, a display section 205, a storage section 206, an NFC communication section 207, an NFC antenna 208, a Wi-Fi communication section 209, a Wi-Fi antenna 210, a camera section 211, a signal processing section 212, a speaker 213, a microphone 214, and an application processor 215. The control section 202 includes, for example, the CPU, the RAM, the ROM, and the like. The ROM stores programs, which are read and operated by the CPU, and the like. The RAM is used as a work memory of the CPU. The CPU controls the respective sections and the entirety of the information processing apparatus 200 by executing various kinds of processing in accordance with the programs stored in the ROM.

The network interface 203 is, for example, to transmit and receive data between the information processing apparatus 200, an external base station, and the like on the basis of the predetermined protocol. As a communication system, for example, there are a wireless local area network (LAN), a 3G line, long term evolution (LTE), and the like. Through communication in the network interface 203, a user is able to perform Internet connection with the information processing apparatus 200, a telephone call with another person, and the like.

The input section 204 is an input function for causing a user to perform various kinds of inputs to the information processing apparatus 200. For example, the input section 204 includes a touch screen formed integrally with the display section 205, a button, a switch, and the like. When a user performs an input operation on the input section 204, a control signal corresponding to the input is generated, and is output to the control section 202. Then, the control section 202 performs arithmetic processing or control corresponding to the control signal. The display section 205 includes, for example, a liquid crystal display (LCD), a plasma display panel (PDP), an organic electro luminescence (EL) panel, and the like. The display section 205 displays a home screen, image contents, video contents, various application screens, or the like of the information processing apparatus 200. Further, the display section 205 also displays a live view, which is obtained by the camera function provided in the information processing apparatus 200, and a user interface of the photography assist according to the present technology.

The storage section 206 is formed of, for example, a mass-storage medium such as a hard disk drive (HDD) flash memory. The storage section 206 stores an operating system (OS) that controls the information processing apparatus 200, application data, various kinds of contents data, and the like. Further, in the embodiment, the photographed image, which is acquired through photography using the imaging apparatus 100, is transmitted to the information processing apparatus 200, and is stored in the storage section 206.

The NFC communication section 207 is an interface that performs non-contact communication with an external apparatus (the imaging apparatus 100 in the present technology or the like), which comes close, in cooperation with the NFC antenna 208, in accordance with the control performed by the control section 202.

The Wi-Fi communication section 209 is an interface that performs wireless communication with the peripheral external apparatus (the imaging apparatus 100 in the present technology or the like), which comes close, in cooperation with the Wi-Fi antenna 210, in accordance with the control performed by the control section 202.

The camera section 211 is a camera module capable of photographing a still image and a moving image. The camera section 211 has a function the same as the imaging function of the above-mentioned imaging apparatus 100. Since the description of the above-mentioned imaging apparatus 100 will be used, description of a detailed configuration of the camera section 211 will be omitted.

The signal processing section 212 includes a modem, an AD/DA converter, a sound codec (not shown in the drawing), and the like. The modem of the signal processing section 212 modulates a sound signal to be transmitted, or demodulates a received signal. The signal to be transmitted is converted into a digital signal by the AD/DA converter, and the received signal is converted into an analog signal by the AD/DA converter. Then, the signal processing section 212 is connected with the speaker 213, by which a sound is output, and a microphone 214 by which a sound is input.

The speaker 213 is a sound output section for outputting sound, and outputs a sound signal, on which predetermined processing is performed by the signal processing section 212, and the like as sound. Thereby, a user is able to hear a phone call sound, sound data stored in the information processing apparatus 200, and the like. Further, the microphone 214 inputs a sound to the information processing apparatus 200 in order to perform an input of instruction performed by a phone call and a sound. The signal processing section 212 performs predetermined processing on the sound which is input from the microphone 214.

The application processor 215 is a processing section that executes various applications which are installed in the information processing apparatus 200. In the present technology, a photography assist application is executed by the application processor 215. The photography assist application is installed in the information processing apparatus 200 in order to link the information processing apparatus 200 to the imaging apparatus 100.

By executing the photography assist application, the application processor 215 functions as an image specification condition setting section 216, an object identification section 217, an image specification instruction section 218, a display control section 219, and an image processing section 220.

The image specification condition setting section 216 performs processing of setting an image specification condition, in accordance with types of the photography assist. As described above, the image specification is to specify a raw image used in image processing which forms a new single image or a plurality of images by using a plurality of images. In the first embodiment, in the image specification, an image, which is acquired by photography performed by the imaging apparatus 100, is set as a raw image. Consequently, in the first embodiment, the image specification condition is set as a photography condition.

The image specification condition setting section 216 first sets combination of the position, the direction, and the tilt of the imaging apparatus 100, which are necessary for the imaging apparatus 100 to perform photography, as an image specification point. The image specification point is set with reference to, for example, a table in which contents of the photography assist and the image processing are associated with the position, the direction, and the tilt of the imaging apparatus 100. Then, the image specification condition setting section 216 sets one of a plurality of image specification points as a photography condition which is the image specification condition. The photography condition is satisfied, and the photography instruction is transmitted from the information processing apparatus 200 to the imaging apparatus 100. Then, when the imaging apparatus 100 performs photography, the image specification condition setting section 216 sets a different image specification point as a subsequent photography condition. Such setting of the photography condition is performed on all the image specification points.

It should be noted that elements, which are set as the image specification point, are not limited to the position, the direction, and the tilt of the imaging apparatus 100, and the image specification point may include elements other than those. Further, the image specification point may be any one of the position, the direction, and the tilt of the imaging apparatus 100, or may be two elements of the position, the direction, and the tilt.

The object identification section 217 identifies the imaging apparatus 100 in the image which is acquired by photography performed by the camera section 211, thereby detecting the position, the direction, and the tilt of the imaging apparatus 100 within the angle of view. As an object identification method, for example, it may be possible to use template matching based on a shape of an object, template matching based on luminance distribution, a method based on a feature amount and the like of an identification target, and the like. Further, precision in identification may be increased through combination of the above-mentioned methods. An identification result obtained by the object identification section 217 is supplied to the image specification instruction section 218. It should be noted that the object identification section 217 is not implemented by the photography assist application, but may be a function which is provided in the information processing apparatus 200 in advance.

The image specification instruction section 218 determines whether or not the position, the direction, and the tilt of the imaging apparatus 100 detected by the object identification section 217 match with the photography condition. Then, when the position, the direction, and the tilt of the imaging apparatus 100 match with the photography condition, a photography instruction to the imaging apparatus 100 is issued. The image specification in the first embodiment is performed through photography of the imaging apparatus 100, and thus the image specification instruction is an instruction to the effect that photography is executed in the imaging apparatus 100. The photography instruction is transmitted to the imaging apparatus 100 through communication performed by the Wi-Fi communication section 209.

The display control section 219 performs control to display various user interfaces for performing the photography assist on the display section 205.

The image processing section 220 performs predetermined image processing in accordance with a mode of the photography assist. For example, when the mode of the photography assist is to obtain a 360-degree panoramic image, processing of generating a 360-degree panoramic image by stitching a plurality of raw images is performed. It should be noted that the image processing section 220 is not an indispensable component of the information processing apparatus 200. The image processing may be performed by the imaging apparatus 100, and may be performed by an apparatus other than the imaging apparatus 100 and the information processing apparatus 200.

It should be noted that the photography assist application may be provided to a user in a state where the application is installed in the information processing apparatus 200 in advance, and may be installed in the information processing apparatus 200 by a user himself or herself. The photography assist application is provided or sold through, for example, an application sales site on the Internet, application download service, and the like. Further, the application may be provided or sold as a portable recording medium such as an optical disk or a semiconductor memory in which the photography assist application is recorded.

The information processing apparatus 200 is configured in such a manner. It should be noted that the information processing apparatus 200 may be an apparatus having a camera function, other than a smartphone, such as a mobile phone, a portable music player, a tablet terminal, and a personal computer.

1-4. Specific Example of Photography Assist and Image Processing 1-4-1. First Example of Photography Assist and Image Processing.

Next, specific examples of the photography assist and the image processing performed by the imaging system 10 will be described. A first example of the photography assist and the image processing shows a case of photographing "a 360-degree panoramic image of the imaging apparatus 100 of which the optical axis is tilted at an angle of 90 degrees to the optical axis of the camera of the information processing apparatus 200" (hereinafter referred to as a "90-degree/360-degree panoramic image"). FIG. 5A is a conceptual diagram illustrating a photography plane of the "90-degree/360-degree panoramic image" in the first example. The arrow indicates a direction of the optical axis of the lens of the information processing apparatus 200, and the hatched portion of a side surface of a cylinder indicates the photography plane of the "90-degree/360-degree panoramic image" of the imaging apparatus 100.

Figure 5C:
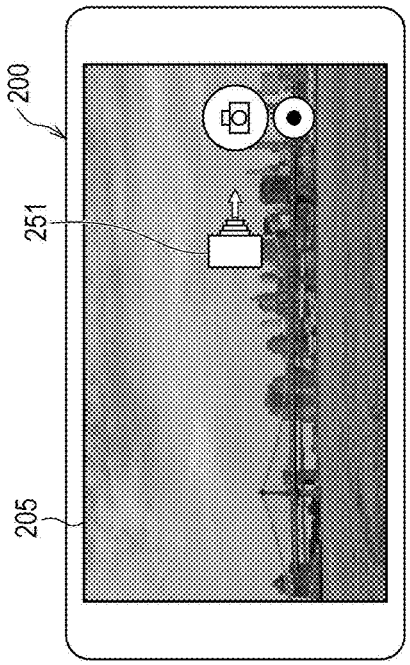
FIG. 5C is a first example of a user interface which is displayed in the information processing apparatus.
Figure 5D:
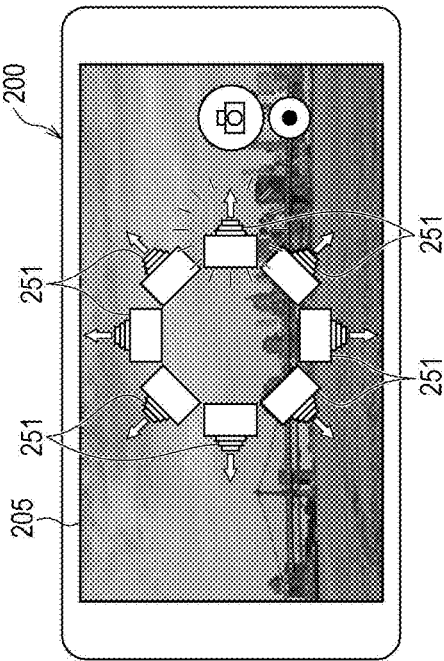
FIG. 5D is a second example of the user interface which is displayed in the information processing apparatus.
Figure 5A:
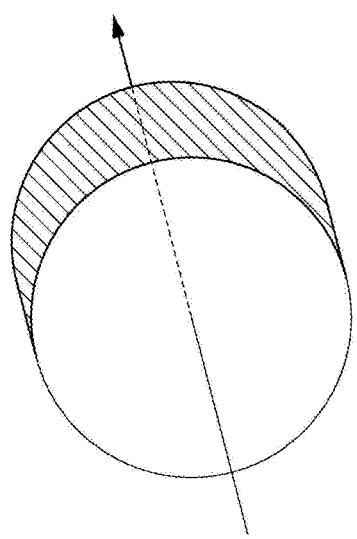
FIG. 5A is a conceptual diagram of a first example of photography assist and image processing.
Figure 5B:
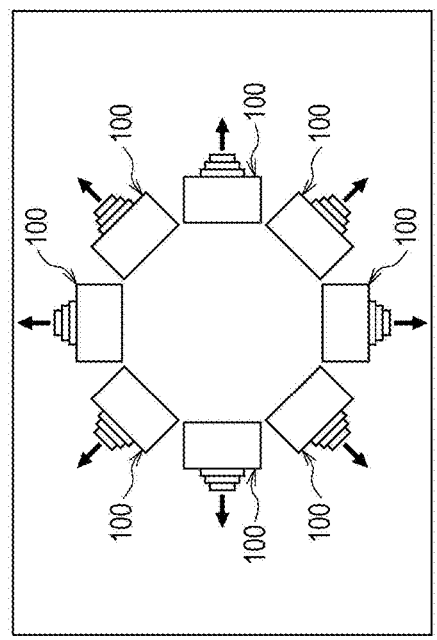
FIG. 5B is a diagram illustrating an imaging apparatus state in the first example.

FIG. 5B shows an example of the image specification points for obtaining a plurality of raw images constituting the "90-degree/360-degree panoramic image" in states of the imaging apparatus 100 viewed in the live view through the lens of the information processing apparatus 200. The image specification point includes the position, the direction, and the tilt of the imaging apparatus 100. Each arrow of FIG. 5B indicates a direction toward which the lens of the imaging apparatus 100 faces. For the 360-degree panoramic image, the image specification point is set such that photography is performed all around 360 degrees through a plurality of image specification points. In order to obtain the "90-degree/360-degree panoramic image", it is necessary to synthesize the plurality of raw images which are photographed so as to stitch the images along 360 degrees. Accordingly, by performing photography at the plurality of image specification points, it is necessary to obtain the plurality of raw images.

As can be seen from FIGS. 5A and 5B, in the first example, at all the image specification points, the optical axis direction of the lens of the imaging apparatus 100 is tilted at an angle of 90 degrees to the optical axis direction of the lens of the information processing apparatus 200. Accordingly, in the live view of the information processing apparatus 200, only the side surface of the imaging apparatus 100 is viewed.

By performing photography while changing the direction for each of the plurality of photography positions, it is possible to obtain the plurality of raw images constituting the 360-degree panoramic image. It should be noted that the number of image specification points shown in FIG. 5B is just an example, and photography may be performed at the number of image specification points smaller or greater than the number shown in the drawing. The image specification condition setting section 216 determines the plurality of image specification points, with reference to a table in which the contents of the photography assist and the image processing are associated with the position, the direction, and the tilt of the imaging apparatus 100 in advance. Then, any one of the plurality of image specification points is set as a first photography condition. When the photography condition is satisfied, a new subsequent image specification point is set as a subsequent photography condition. In such a manner, the plurality of image specification points is sequentially set one by one as photography conditions. When the photography condition is satisfied, the photography instruction is issued from the image specification instruction section 218, and photography is performed by the imaging apparatus 100.

FIG. 5C is a first example of the user interface that indicates the photography condition displayed on the display section 205 of the information processing apparatus 200. In the user interface, an icon 251 indicating the position, the direction, and the tilt of the imaging apparatus 100 as the photography condition is displayed to be superposed upon the live view displayed on the display section 205. In the example of FIG. 5C, only one icon 251 indicating the photography condition, which is set among the plurality of existing image specification points, is displayed. It should be noted that FIG. 5C shows, in addition to the icon 251 indicating the photography condition, the arrow indicating the photography direction of the imaging apparatus 100. As described above, by displaying the icon 251 such that it is superposed upon the live view, the photography condition is presented to a user.

First, the user directs the camera of the information processing apparatus 200 to the imaging apparatus 100. Next, the user moves the imaging apparatus 100 in accordance with the position, the direction, and the tilt of the imaging apparatus 100 as the photography condition which is indicated by the icon 251 displayed on the display section 205. Then, when the imaging apparatus 100 matches with the photography condition, the image specification instruction section 218 issues a photography instruction. The imaging apparatus 100, which receives the photography instruction, performs photography on the basis of the position, the direction, and the tilt of the photography condition matching therewith. When the photography instruction is issued and photography is performed by the imaging apparatus 100, the image specification condition setting section 216 sets an image specification point, at which photography has not been performed yet, as a subsequent photography condition. When the photography instruction is issued and photography is performed by the imaging apparatus 100, in the user interface displayed on the display section 205, the icon 251 indicating the photography condition, by which photography was performed, disappears. Then, the icon 251 indicating the image specification point, which is set as a subsequent photography condition, is displayed. This process is performed on all the image specification points.

FIG. 5D is a second example of the user interface that indicates the photography condition displayed on the display section 205 of the information processing apparatus 200. In the example of FIG. 5D, a plurality of icons 251, 251, . . . indicating all the image specification points is displayed to be superposed upon the live view. Further, one icon 251 indicating the image specification point, which is set as the photography condition, is highlighted. Examples of a method of highlighting the icon 251 include a method of blinking the icon, a method of thickening the line of the icon, a method of coloring the icon, a method of marking the icon, and the like. Further, by thinning the lines of the icons indicating the image specification points which are not set as the photography condition, it may be possible to highlight the image specification point which is set as the photography condition. In the example of FIG. 5D, the icon indicating the image specification point, which is set as the photography condition, is blinked.

It should be noted that, in a similar manner to the example of FIG. 5C, FIG. 5D shows, in addition to the icons 251 indicating the photography conditions, the arrows indicating the photography directions of the imaging apparatus 100. As described above, by displaying the icons 251 on the live view, the photography conditions are presented to a user. First, the user directs the camera of the information processing apparatus 200 to the imaging apparatus 100. Next, the user moves the imaging apparatus 100 in accordance with the position, the direction, and the tilt of the imaging apparatus 100 as the photography condition which is indicated by the highlighted icon 251 displayed on the display section 205. Then, when the imaging apparatus 100 matches with the photography condition, the image specification instruction section 218 issues a photography instruction.

The imaging apparatus 100, which receives the photography instruction, performs photography on the basis of the position, the direction, and the tilt of the photography condition matching therewith. When the photography instruction is issued and photography is performed by the imaging apparatus 100, the image specification condition setting section 216 sets an image specification point, at which photography has not been performed yet, as a subsequent photography condition. In the user interface displayed on the display section 205, highlighting of the highlighted icon 251 is released. Then, the icon 251 indicating the image specification point, which is set as a subsequent photography condition, is highlighted as the photography condition. This process is performed on all the image specification points. By stitching the raw images photographed in such a manner, it is possible to obtain the "90-degree/360-degree panoramic image".

1-4-2. Second Example of Photography Assist and Image Processing.

A second example of the photography assist and the image processing shows a case of photographing "a 360-degree panoramic image of the imaging apparatus 100 of which the optical axis is tilted at an angle of 45 degrees to the optical axis of the camera of the information processing apparatus 200" (hereinafter referred to as a "45-degree/360-degree panoramic image").

Figure 6C:
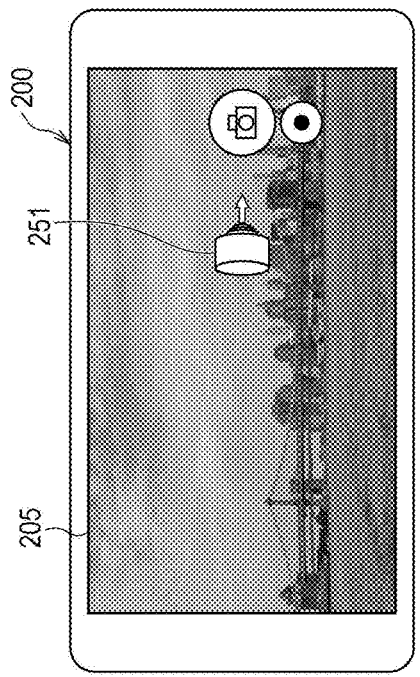
FIG. 6C is a first example of a user interface which is displayed in the information processing apparatus.
Figure 6D:
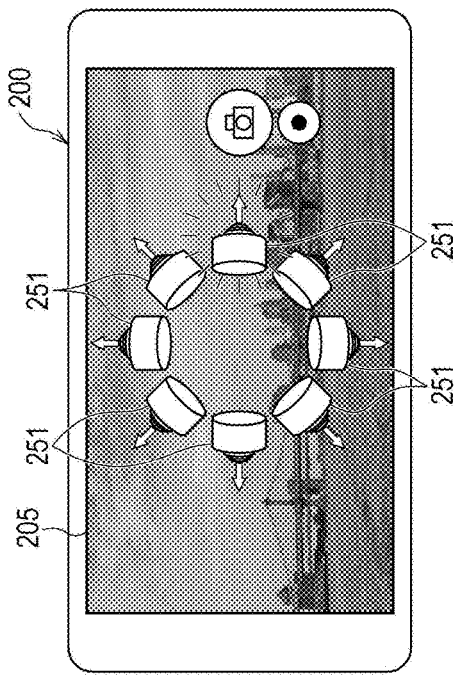
FIG. 6D is a second example of the user interface which is displayed in the information processing apparatus.
Figure 6A:
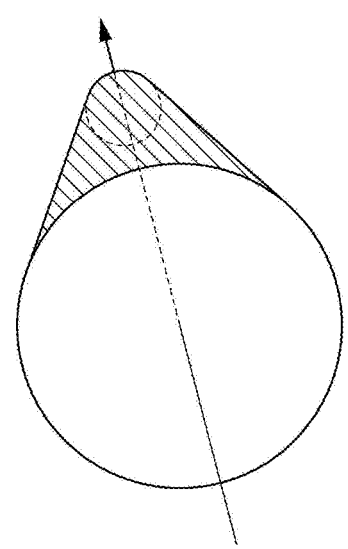
FIG. 6A is a conceptual diagram of a second example of photography assist and image processing.

FIG. 6A is a conceptual diagram illustrating a photography plane of the "45-degree/360-degree panoramic image" in the second example. The arrow indicates a direction of the optical axis of the lens of the information processing apparatus 200, and the hatched portion of a side surface of a circular cone of FIG. 6A indicates the photography plane of the "45-degree/360-degree panoramic image" of the imaging apparatus 100.

Figure 6B:
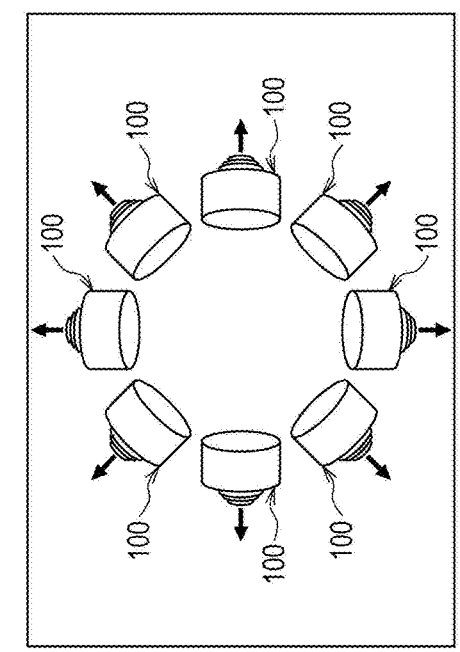
FIG. 6B is a diagram illustrating an imaging apparatus state in the second example.

FIG. 6B shows an example of the image specification points for obtaining a plurality of raw images constituting the "45-degree/360-degree panoramic image" in states of the imaging apparatus 100 viewed in the live view through the lens of the information processing apparatus 200. The image specification point indicates the position, the direction, and the tilt of the imaging apparatus 100. Each arrow of FIG. 6B indicates a direction toward which the lens of the imaging apparatus 100 faces. For the 360-degree panoramic image, the image specification point is set such that photography is performed all around 360 degrees through a plurality of image specification points. In order to obtain the "45-degree/360-degree panoramic image", it is necessary to combine and synthesize the plurality of raw images as a 360-degree-stitched image. Accordingly, it is necessary to photograph the plurality of raw images while changing the position of the imaging apparatus 100.

As can be seen from FIGS. 6A and 6B, in the second example, at all the image specification points, the optical axis direction of the lens of the imaging apparatus 100 is tilted at an angle of 45 degrees to the optical axis direction of the lens of the information processing apparatus 200. By performing photography while changing the direction for each of the plurality of positions, it is possible to obtain the plurality of raw images constituting the 360-degree panoramic image. It should be noted that the number of image specification points shown in FIG. 6B is just an example, and photography may be performed at the number of image specification points smaller or greater than the number shown in the drawing.

FIG. 6C is a first example of the user interface that indicates the photography condition displayed on the display section 205 of the information processing apparatus 200. In the user interface, the icon 251 indicating the position, the direction, and the tilt of the imaging apparatus 100 as the photography condition is displayed to be superposed upon the live view displayed on the display section 205. In the example of FIG. 6C, only one icon 251 indicating the photography condition, which is set among the plurality of existing image specification points, is displayed to be superposed upon the live view. It should be noted that FIG. 6C shows, in addition to the icon 251 indicating the photography condition, the arrow indicating the photography direction of the imaging apparatus 100. As described above, by displaying the icon 251 such that it is superposed upon the live view, the photography condition is presented to a user.

First, the user directs the camera of the information processing apparatus 200 to the imaging apparatus 100. Next, the user moves the imaging apparatus 100 in accordance with the position, the direction, and the tilt of the imaging apparatus 100 as the photography condition which is indicated by the icon 251 in the live view displayed on the display section 205. Then, when the imaging apparatus 100 matches with the photography condition, the image specification instruction section 218 issues a photography instruction.

The imaging apparatus 100, which receives the photography instruction, performs photography on the basis of the position, the direction, and the tilt of the photography condition matching therewith. Then, the image specification condition setting section 216 sets an image specification point, at which photography has not been performed yet, as a subsequent photography condition. When the photography instruction is issued and photography is performed by the imaging apparatus 100, in the user interface displayed on the display section 205, the icon 251 indicating the photography condition, by which photography was performed, disappears. Then, the icon 251 indicating the image specification point, which is set as a subsequent photography condition, is displayed. This process is performed on all the image specification points.

FIG. 6D is a second example of the user interface that indicates the photography condition displayed on the display section 205 of the information processing apparatus 200. In the example of FIG. 6D, the icons 251 indicating all the image specification points are displayed to be superposed upon the live view. Further, one icon 251 indicating the image specification point, which is set as the photography condition, is highlighted. The method of highlighting the icon 251 is the same as that described in the first example of the photography assist and the image processing. In the example of FIG. 6D, the icon 251 indicating the image specification point, which is set as the photography condition, is blinked. It should be noted that, in a similar manner to the example of FIG. 6C, FIG. 6D shows, in addition to the icons 251 indicating the photography conditions, the arrows indicating the photography directions of the imaging apparatus 100. As described above, by displaying the icon 251 on the live view, the photography condition is presented to a user.

First, the user directs the camera of the information processing apparatus 200 to the imaging apparatus 100. Next, the user moves the imaging apparatus 100 in accordance with the position, the direction, and the tilt of the imaging apparatus 100 as the photography condition which is indicated by the highlighted icon 251 in the live view displayed on the display section 205. Then, when the imaging apparatus 100 matches with the photography condition, the image specification instruction section 218 issues a photography instruction.

The imaging apparatus 100, which receives the photography instruction, performs photography on the basis of the position, the direction, and the tilt of the photography condition matching therewith. When the photography instruction is issued and photography is performed by the imaging apparatus 100, the image specification condition setting section 216 sets an image specification point, at which photography has not been performed yet, as a subsequent photography condition. In the user interface displayed on the display section 205, highlighting of the highlighted icon 251 is released. The icon indicating the subsequent photography condition is highlighted. This process is performed on all the image specification points. It should be noted that the first and second examples of the photography assist and the image processing were described as the case of the 360-degree panoramic image, but the panoramic image is not limited to 360 degrees, and a different angle, for example, 180 degrees, may be allowed. Further, the tilt of the imaging apparatus 100 to the optical axis of the lens of the information processing apparatus 200 is not limited to 90 and 45 degrees, and a different angle may be allowed.

1-4-3. Third Example of Photography Assist and Image Processing

Figure 7A:
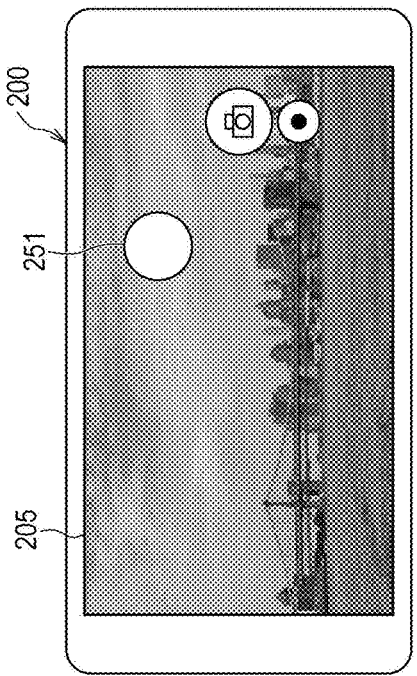
FIG. 7A is a conceptual diagram of a third example of photography assist and image processing.

A third example of the photography assist and the image processing shows a case of photographing a larger image (hereinafter referred to as a large-sized image) than an image that can be photographed by the imaging apparatus 100. FIG. 7A is a conceptual diagram illustrating a photography plane of the "large-sized image" in the third example. The arrow indicates a direction of the optical axis of the lens of the information processing apparatus 200, and the hatched portion of the plane of FIG. 7A is a photography plane of the "large-sized image" of the imaging apparatus 100. In the example of FIG. 7A, a single large-sized image is formed through combination of four raw images. However, the number of raw images is not limited to four, and may be equal to or less than four or may be equal to or greater than four.

Figure 7C:
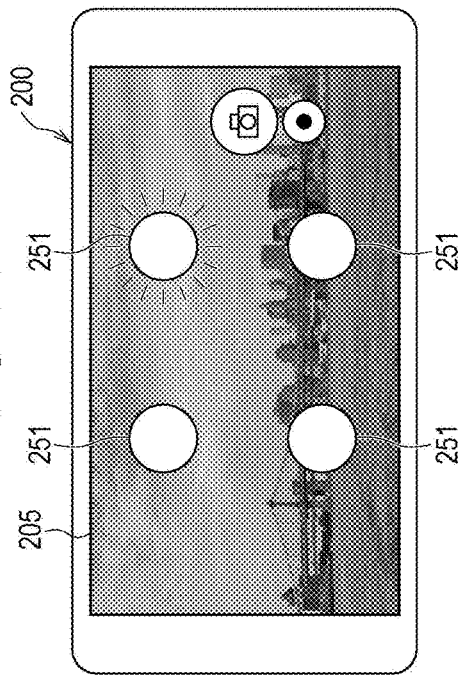
FIG. 7C is a first example of a user interface which is displayed in the information processing apparatus.
Figure 7B:
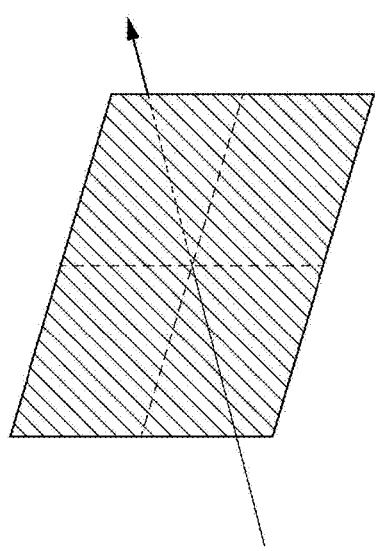
FIG. 7B is a diagram illustrating an imaging apparatus state in the third example.

FIG. 7B shows an example of the image specification points for obtaining a plurality of raw images constituting the "large-sized image" in states of the imaging apparatus 100 viewed in the live view through the lens of the information processing apparatus 200.

In order to generate a "large-sized image", it is necessary to combine a plurality of raw images. Accordingly, it is necessary to photograph the plurality of raw images while changing the position of the imaging apparatus 100. As can be seen from FIGS. 7A and 7B, in the third example, even at any of the image specification points, the optical axis direction of the lens of the imaging apparatus 100 is in parallel with the optical axis direction of the lens of the information processing apparatus 200 (the tilt is at 0 degrees). Accordingly, in the live view of the information processing apparatus 200, only the rear surface of the imaging apparatus 100 is viewed.

FIG. 7C is a first example of the user interface that indicates the photography condition displayed on the display section 205 of the information processing apparatus 200. In the user interface, the icon 251 indicating the position, the direction, and the tilt of the imaging apparatus 100 as the photography condition is displayed to be superposed upon the live view displayed on the display section 205. In the example of FIG. 7C, only the icon 251 indicating the photography condition, which is set among the plurality of existing image specification points, is displayed to be superposed upon the live view.

First, the user directs the camera of the information processing apparatus 200 to the imaging apparatus 100. Next, the user moves the imaging apparatus 100 in accordance with the position and the direction of the imaging apparatus 100 as the photography condition which is indicated by the icon 251 in the live view displayed on the display section 205. Then, when the imaging apparatus 100 matches with the photography condition, the image specification instruction section 218 issues a photography instruction. The imaging apparatus 100, which receives the photography instruction, performs photography on the basis of the position, the direction, and the tilt of the photography condition matching therewith. When the photography instruction is issued and photography is performed by the imaging apparatus 100, the image specification condition setting section 216 sets an image specification point, at which photography has not been performed yet, as a subsequent photography condition. In the user interface displayed on the display section 205, the icon 251 indicating the photography condition, by which photography was performed, disappears, and the icon 251 indicating the image specification point, which is set as a subsequent photography condition, is displayed. This process is performed on all the image specification points.

Figure 7D:
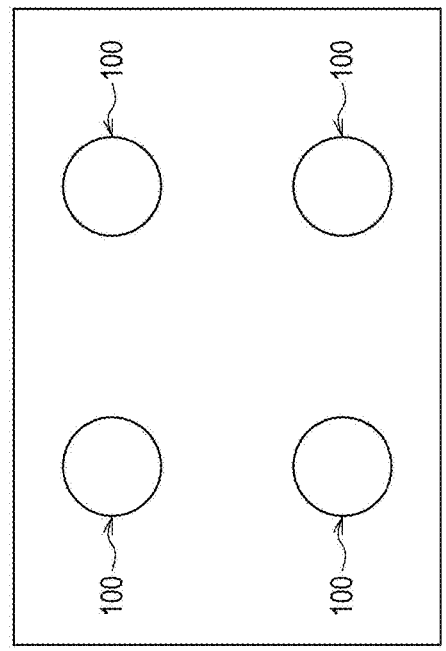
FIG. 7D is a second example of the user interface which is displayed in the information processing apparatus.

FIG. 7D is a second example of the user interface that indicates the photography condition displayed on the display section 205 of the information processing apparatus 200. In the example of FIG. 7D, the icons 251 indicating all the image specification points are displayed to be superposed upon the live view. Further, one icon 251 indicating the image specification point, which is set as the photography condition, is highlighted. The method of highlighting the icon 251 is the same as that described in the first example of the photography assist and the image processing. In the example of FIG. 7D, the icon 251 indicating the image specification point, which is set as the photography condition, is blinked. It should be noted that FIG. 7D shows, in addition to the icon 251 indicating the photography condition, the arrow indicating the photography direction of the imaging apparatus 100. As described above, by displaying the icon 251 on the live view, the photography condition is presented to a user.

First, the user directs the camera of the information processing apparatus 200 to the imaging apparatus 100. Next, the user moves the imaging apparatus 100 in accordance with the photography condition which is indicated by the highlighted icon 251 displayed on the display section 205. Then, when the imaging apparatus 100 matches with the photography condition, the image specification instruction section 218 issues a photography instruction. The imaging apparatus 100, which receives the photography instruction, performs photography on the basis of the position, the direction, and the tilt of the photography condition matching therewith. When the photography instruction is issued and photography is performed by the imaging apparatus 100, the image specification condition setting section 216 sets an image specification point, at which photography has not been performed yet, as a subsequent photography condition. In the user interface displayed on the display section 205, highlighting of the highlighted icon 251 is released. Then, the icon 251 indicating the image specification point, which is set as a subsequent photography condition, is highlighted. This process is performed on all the image specification points.

1-4-4. Fourth Example of Photography Assist and Image Processing

A fourth example of the photography assist and the image processing shows a case of generating a 3D modeling image. FIG. 8A shows an example of the image specification points for obtaining a plurality of raw images constituting the 3D modeling image in states of the imaging apparatus 100 viewed in the live view through the lens of the information processing apparatus 200.

In FIG. 8A, an object X is a subject of a 3D modeling target. The image specification point includes the position, the direction, and the tilt of the imaging apparatus 100. Each arrow of FIG. 8A indicates a direction toward which the lens of the imaging apparatus 100 faces. The 3D modeling image is generated by synthesizing the plurality of raw images photographed from different directions. Consequently, by performing photography at the plurality of image specification points, it is necessary to obtain the plurality of raw images. Accordingly, all the image specification points have different positions, different directions, and different tilts. It should be noted that the number of image specification points shown in FIG. 8A is just an example, and photography may be performed at the number of image specification points smaller or greater than the number shown in the drawing. Further, photography may be performed on the basis of the positions, the directions, and the tilts different from the positions, the directions, and the tilts shown in FIG. 8A.

The image specification condition setting section 216 determines the plurality of image specification points, with reference to the table. Then, when one of the plurality of image specification points is set as a photography condition and the photography condition is satisfied, a separate image specification point is set as a subsequent photography condition, in a similar manner to the first example. Further, when the photography condition is satisfied, the photography instruction is issued from the image specification instruction section 218, and photography is performed by the imaging apparatus 100, in a similar manner to the first example.

FIG. 8B is a first example of the user interface that indicates the photography condition displayed on the display section 205 of the information processing apparatus 200. In the user interface, the icon 251 indicating the position, the direction, and the tilt of the imaging apparatus 100 as the photography condition is displayed to be superposed upon the live view displayed on the display section 205. In the example of FIG. 8B, only the icon 251 indicating the image specification point, which is set as the photography condition, among the plurality of existing image specification points is displayed to be superposed upon the live view. It should be noted that FIG. 8B shows, in addition to the icon 251 indicating the photography condition, the arrow indicating the photography direction of the imaging apparatus 100. As described above, by displaying the icon 251 on the live view, the photography condition is presented to a user.

First, the user directs the camera of the information processing apparatus 200 to the imaging apparatus 100. Next, the user moves the imaging apparatus 100 in accordance with the photography condition which is indicated by the icon 251 displayed on the display section 205. Then, when the imaging apparatus 100 matches with the photography condition, the image specification instruction section 218 issues a photography instruction. The imaging apparatus 100, which receives the photography instruction, performs photography on the basis of the position, the direction, and the tilt of the photography condition matching therewith. When the photography instruction is issued and photography is performed by the imaging apparatus 100, the image specification condition setting section 216 sets an image specification point, at which photography has not been performed yet, as a subsequent photography condition. In the user interface displayed on the display section 205, the icon 251 indicating the photography condition, by which photography was performed, disappears, and the icon 251 indicating the image specification point, which is set as a subsequent photography condition, is displayed. This process is performed on all the image specification points.

FIG. 8C is a second example of the user interface that indicates the photography condition displayed on the display section 205 of the information processing apparatus 200. In the example of FIG. 8C, the icons 251 indicating all the image specification points are displayed to be superposed upon the live view. Further, one icon 251 indicating the image specification point, which is set as the photography condition, is highlighted. The method of highlighting the icon 251 is the same as that described in the first example of the photography assist and the image processing. In the example of FIG. 8C, the icon 251 indicating the image specification point, which is set as the photography condition, is blinked. It should be noted that FIG. 8C shows, in addition to the icon 251 indicating the photography condition, the arrow indicating the photography direction of the imaging apparatus 100. As described above, by displaying the icon 251 on the live view, the photography condition is presented to a user.

First, the user directs the camera of the information processing apparatus 200 to the imaging apparatus 100. Next, the user moves the imaging apparatus 100 in accordance with the photography condition which is indicated by the highlighted icon 251 displayed on the display section 205. Then, when the imaging apparatus 100 matches with the photography condition, the image specification instruction section 218 issues a photography instruction. The imaging apparatus 100, which receives the photography instruction, performs photography on the basis of the position, the direction, and the tilt of the photography condition matching therewith. When the photography instruction is issued and photography is performed by the imaging apparatus 100, the image specification condition setting section 216 sets an image specification point, at which photography has not been performed yet, as a subsequent photography condition. In the user interface displayed on the display section 205, highlighting of the highlighted icon 251 is released. Then, the icon 251 indicating the image specification point, which is set as a subsequent photography condition, is highlighted. This process is performed on all the image specification points.

1-4-5. Fifth Example of Photography Assist and Image Processing

A fifth example of the photography assist and the image processing shows a case of generating a 3D image. FIG. 9A is a diagram illustrating an overview of photography of raw images used to generate a 3D image. In FIG. 9A, an object X is a subject of a 3D image. In order to generate the 3D image, left-side and right-side parallax images of the subject photographed at different positions are necessary. The left-side and right-side parallax images are set as raw images. It should be noted that the parallax is defined as a difference between the respective positions of the subject at a close-up range in the horizontal direction within a left-side image and a right-side image. The larger the parallax, the deeper the depth of the subject to be displayed as a 3D image, that is, the stronger the perception of stereoscopic depth becomes. Further, the parallax may be defined as a difference between a distance from the left end of the left-side close-up image and a distance from the left end of the right-side close-up image.

Figure 9C:
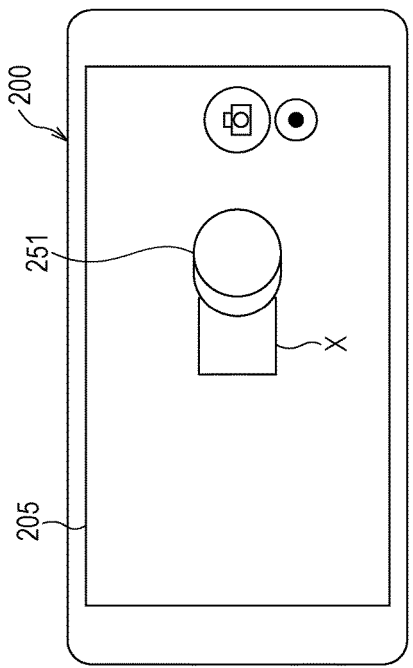
FIG. 9C is a first example of a user interface which is displayed in the information processing apparatus.
Figure 9D:
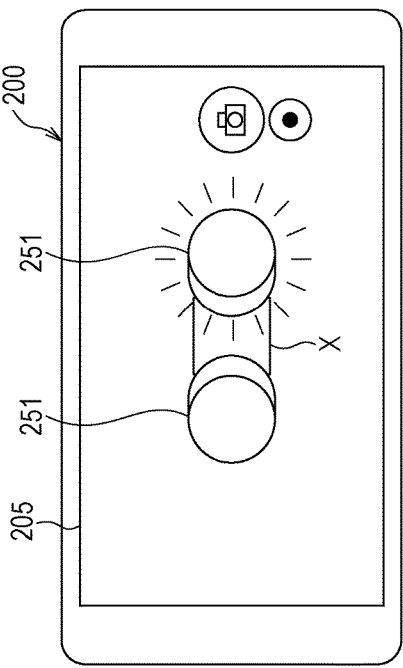
FIG. 9D is a second example of the user interface which is displayed in the information processing apparatus.
Figure 9A:
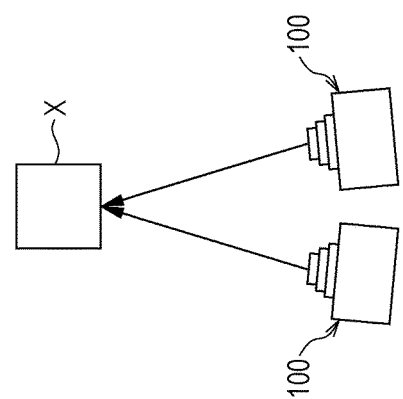
FIG. 9A is a conceptual diagram of a fifth example of photography assist and image processing.
Figure 9B:
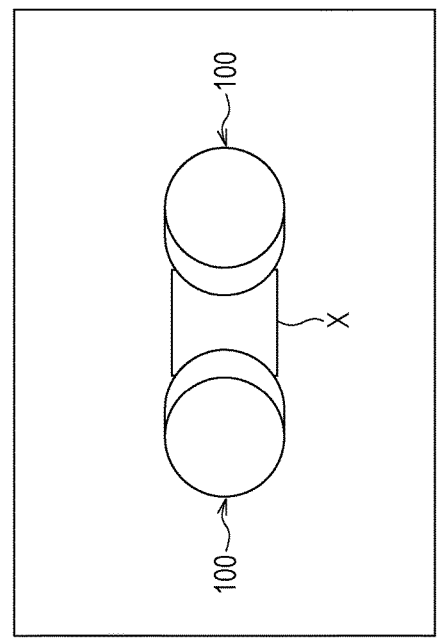
FIG. 9B is a diagram illustrating an imaging apparatus state in the fifth example.

FIG. 9B shows an example of the image specification points for obtaining a plurality of raw images constituting the 3D image in states of the imaging apparatus 100 viewed in the live view through the lens of the information processing apparatus 200. The image specification point includes the position, the direction, and the tilt of the imaging apparatus 100. It should be noted that the image specification points are set in accordance with the amount of parallax defining the perception of 3D depth.

FIG. 9C is a first example of the user interface that indicates the photography condition displayed on the display section 205 of the information processing apparatus 200. In the user interface, the icon 251 indicating the position, the direction, and the tilt of the imaging apparatus 100 as the photography condition is displayed to be superposed upon the live view displayed on the display section 205. In the example of FIG. 9C, only the icon 251 indicating the image specification point, which is set as the photography condition, among the plurality of existing image specification points is displayed to be superposed upon the live view. It should be noted that FIG. 9C shows, in addition to the icon 251 indicating the photography condition, the arrow indicating the photography direction of the imaging apparatus 100. As described above, by displaying the icon 251 on the live view, the photography condition is presented to a user.

First, the user directs the camera of the information processing apparatus 200 to the imaging apparatus 100. Next, the user moves the imaging apparatus 100 so as to match the imaging apparatus 100 with the photography condition which is indicated by the icon 251 displayed on the display section 205. Then, when the imaging apparatus 100 matches with the photography condition, the image specification instruction section 218 issues a photography instruction. The imaging apparatus 100, which receives the photography instruction, performs photography on the basis of the position, the direction, and the tilt of the photography condition matching therewith. When the photography instruction is issued and photography is performed by the imaging apparatus 100, the image specification condition setting section 216 sets an image specification point, at which photography has not been performed yet, as a subsequent photography condition. In the user interface displayed on the display section 205, the icon 251 indicating the photography condition, by which photography was performed, disappears, and the icon 251 indicating the image specification point, which is set as a subsequent photography condition, is displayed. This process is performed on all the image specification points.

FIG. 9D is a second example of the user interface that indicates the photography condition displayed on the display section 205 of the information processing apparatus 200. In the example of FIG. 9D, the icons 251 indicating all the image specification points are displayed to be superposed upon the live view. Further, one icon 251 indicating the image specification point, which is set as the photography condition, is highlighted. The method of highlighting the icon 251 is the same as that described in the first example of the photography assist and the image processing. In the example of FIG. 9D, the icon 251 indicating the image specification point, which is set as the photography condition, is blinked. It should be noted that FIG. 9D shows, in addition to the icon 251 indicating the photography condition, the arrow indicating the photography direction of the imaging apparatus 100. As described above, by displaying the icon 251 on the live view, the photography condition is presented to a user.

First, the user directs the camera of the information processing apparatus 200 to the imaging apparatus 100. Next, the user moves the imaging apparatus 100 in accordance with the photography condition which is indicated by the highlighted icon 251 displayed on the display section 205. Then, when the imaging apparatus 100 matches with the photography condition, the image specification instruction section 218 issues a photography instruction. The imaging apparatus 100, which receives the photography instruction, performs photography on the basis of the position, the direction, and the tilt of the photography condition matching therewith. When the photography instruction is issued and photography is performed by the imaging apparatus 100, the image specification condition setting section 216 sets an image specification point, at which photography has not been performed yet, as a subsequent photography condition. In the user interface displayed on the display section 205, highlighting of the highlighted icon 251 is released. Then, the icon 251 indicating the image specification point, which is set as a subsequent photography condition, is highlighted. This process is performed on all the image specification points.

It should be noted that, as the method of presenting the photography condition in the user interface, either the method of the first example, in which a single icon 251 is displayed, or the method of the second example, in which the icon 251 is highlighted, may be employed. Further, it may be possible to adopt a configuration in which a user is able to select whether to employ either of the display methods. Furthermore, even in either of the first and second examples, the icons 251 may be translucently displayed so as not to cover the live view.

The present technology can be applied to the above-mentioned image processing and acquisition of the raw images for the image processing. It should be noted that, other than in the above-mentioned five examples, the present technology can be applied to any system if it generates a single or a plurality of new images by using a plurality of images.

1-5. Processing in Imaging System

1-5-1. Transmission Processing of Sensor Information Performed by Imaging Apparatus Next, processing performed in the imaging system 10 will be described. First, processing of transmitting sensor information to the information processing apparatus 200 performed by the imaging apparatus 100 will be described.

Figure 10:
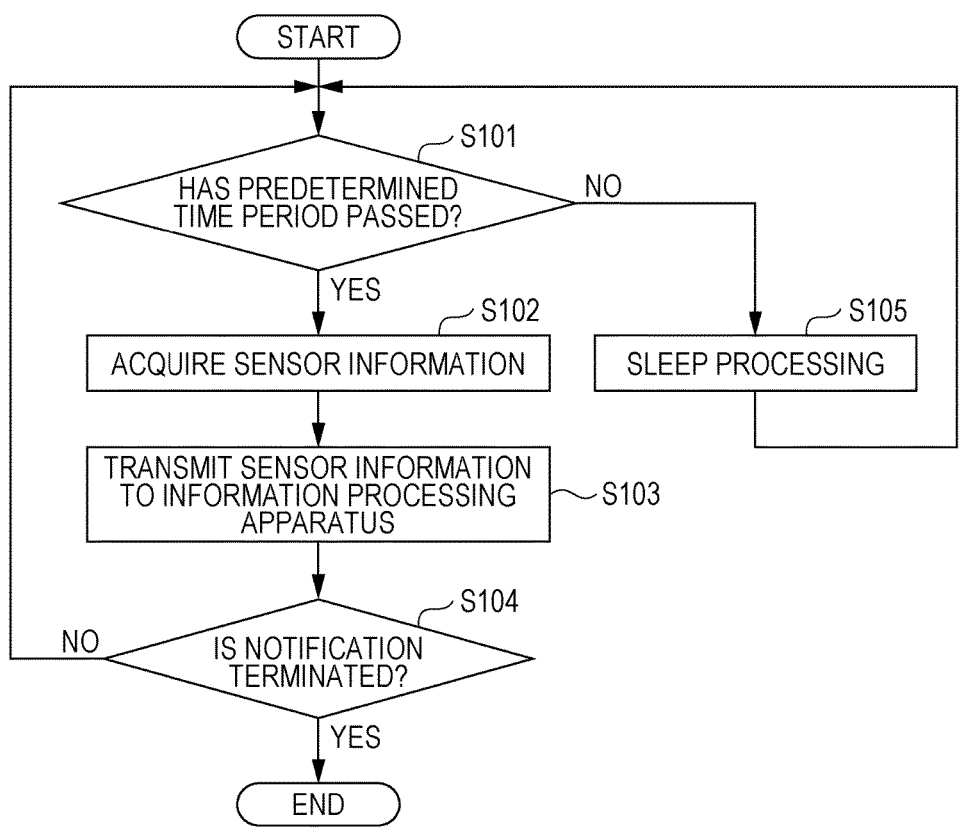
FIG. 10 is a flowchart illustrating a flow of processing of transmitting sensor information to the information processing apparatus performed by the imaging apparatus.

FIG. 10 is a flowchart illustrating a flow of processing of transmitting sensor information. This processing is performed under control of the control section 116 of the imaging apparatus 100. It should be noted that, in the processing performed between the imaging apparatus 100 and the information processing apparatus 200, it is the premise that communication using Wi-Fi is established through the NFC communication between the imaging apparatus 100 and the information processing apparatus 200.

First, in step S101, it is determined whether or not a predetermined time period as an interval of repetition has passed. When the predetermined time period has passed, the processing advances to step S102 (Yes in step S101). Then, in step S102, the control section 116 acquires the sensor information from each of the gyro sensor 113, the acceleration sensor 114, and the direction sensor 115.

Next, in step S103, the sensor information is transmitted to the information processing apparatus 200 through communication of the Wi-Fi communication section 111. Then, in step S104, it is determined whether or not the transmission processing ends. The determination as to whether or not the transmission processing ends is performed, for example, by determining whether or not the imaging apparatus 100 is in the photography assist mode. The reason is that, when the imaging apparatus 100 is not in the photography assist mode, it is not necessary for the imaging apparatus 100 to transmit the sensor information to the information processing apparatus 200. Accordingly, in the photography assist mode, the imaging apparatus 100 continuously transmits the sensor information to the information processing apparatus 200. When the transmission ends, the processing ends (Yes in step S104).

In contrast, in step S104, when it is determined that the transmission processing does not end, the processing advances to step S101 (No in step S104). Then, in step S101, it is determined whether or not the predetermined time period as the interval of repetition has passed.

In step S101, when it is determined that the predetermined time period as the interval of repetition has not passed, the processing advances to step S105 (No in step S101). Then, in step S105, sleep processing is performed. The sleep processing is to cause the imaging apparatus 100 to be in a standby state without performing an operation during a predetermined period. In step S101, it is determined whether the predetermined time period as the interval of repetition has passed. When the predetermined time period as the interval of repetition has not passed, the sleep processing is performed in step S105. Thereby, the imaging apparatus 100 continuously transmits the sensor information to the information processing apparatus 200 with an interval of a certain time period.

As described above, the processing of transmitting sensor information is performed by the imaging apparatus 100.

1-5-2. Processing in Information Processing Apparatus

Next, the photography instruction processing in the information processing apparatus 200 will be described. FIG. 11 is a flowchart illustrating a flow of processing performed by the information processing apparatus 200.

First, in step S201, processing of setting the photography assist mode is performed. In the setting of the photography assist mode, for example, a plurality of photography assist modes is presented to a user on a menu screen displayed on the display section 205 as shown in FIGS. 12A and 12B, and is set in accordance with an input selected by the user.

Figure 12A:
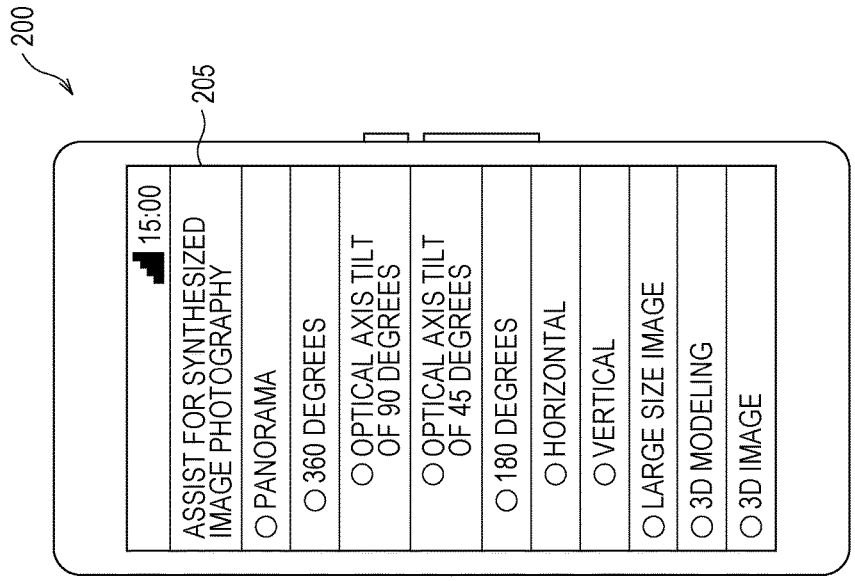
FIGS. 12A and 12B are diagrams illustrating examples of a photography assist mode selection screen which is displayed on a display section of the information processing apparatus.
Figure 12B:
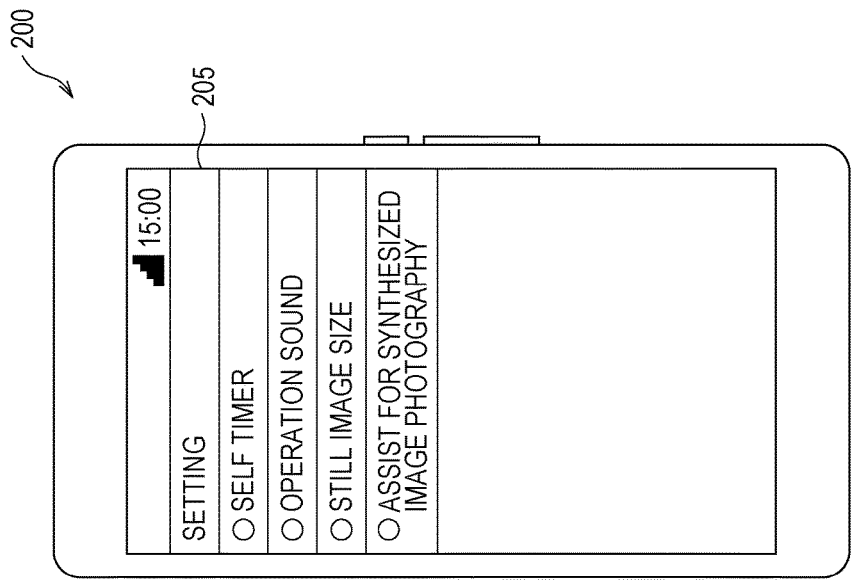

In the examples of FIGS. 12A and 12B, on the setting screen of the information processing apparatus 200 shown in FIG. 12A, when the "assist for synthesized image photography" is selected, the setting screen is changed into a screen for selecting details of the photography assist shown in FIG. 12B.

Next, in step S202, the image specification condition setting section 216 determines the plurality of image specification points. As described above, for example, the image specification points are set with reference to a table in which the photography assist modes are associated with the positions, the directions, and the tilts of the imaging apparatus 100 constituting the image specification points. Then, in step S203, a list of the image specification points is stored in the storage section 206, RAM, or the like.

Next, in step S204, the image specification condition setting section 216 sets any one of the plurality of existing image specification points as a photography condition which is a target of determination performed by the image specification instruction section 218. This is a first photography condition.

Subsequently, in step S205, under control of the display control section 219, the user interface displayed on the display section 205 presents the photography condition to the user.

Next, in step S206, the image specification instruction section 218 determines whether or not the state (all or any one of the position, the direction, and the tilt) of the imaging apparatus 100 within the angle of view of the information processing apparatus 200 matches with the photography condition. As described above, it is determined whether or not the state of the imaging apparatus 100 matches with the photography condition, on the basis of the state of the imaging apparatus 100 detected by the object identification section 217. When the state of the imaging apparatus 100 does not match with the photography condition, the determination processing of step S206 is repeated (No in step S206). In contrast, when the state of the imaging apparatus 100 matches with the photography condition, the processing advances to step S207 (Yes in step S206). Then, in step S207, the image specification instruction section 218 issues the photography instruction, and transmits the photography instruction to the imaging apparatus 100 through communication performed by the Wi-Fi communication section 209.

Subsequently, in step S208, the image specification instruction section 218 verifies whether or not the photography instructions are issued from all the image specification points. When the photography instructions are issued from all the image specification points, the processing advances to step S209 (No in step S208).

Then, in step S209, the image specification condition setting section 216 sets the image specification point, which has not issue the photography instruction yet, as a subsequent photography condition. In the setting of the photography condition, the image specification point adjacent to the image specification point, which is set as the immediately previous photography condition, among the plurality of existing image specification points may be set as a subsequent photography condition. Then, also in the setting of the subsequent photography condition, the adjacent image specification point may be set as a photography condition. That is, the photography conditions may be set sequentially from the image specification point to the image specification point adjacent thereto. By setting the photography conditions in such a manner, a distance of movement of the imaging apparatus 100 from the image specification point to the image specification point decreases. Therefore, it is possible to promptly and easily acquire the raw images. However, the setting order of the photography conditions is not limited to this.

The processing returns to step S206 again, and steps S206 to S209 are repeated. Thereby, determination as to the newly set photography condition is made, the photography instructions are issued, and determination as to whether the photography instructions are issued from all the image specification points is made.

Subsequently, in step S208, the image specification instruction section 218 determines whether or not the photography instructions are issued from all the image specification points. When the photography instructions are issued from all the image specification points, the processing advances to step S210 (Yes in step S208).

Then, in step S210, the image processing section 220 performs predetermined image processing according to the mode of the photography assist. It should be noted that, as described later, whenever the imaging apparatus 100 acquires the raw image through photography, the raw image is transmitted to the information processing apparatus 200. Consequently, after the photography instructions are issued from all the image specification points and the imaging apparatus 100 performs photography, all the raw images are transmitted to the information processing apparatus 200.

Subsequently, the processing in the information processing apparatus 200 ends. It should be noted that the image processing may be performed by an apparatus different from the information processing apparatus 200. Since the information processing apparatus 200 receives all the raw images, when the different apparatus performs the image processing, it is necessary to transfer all the raw images from the information processing apparatus 200 to the other apparatuses. Further, the photography instruction to the imaging apparatus 100 may be transmitted from the information processing apparatus 200, and the photographed raw image may be directly transmitted from the imaging apparatus 100 to a different apparatus that performs the image processing.

1-5-3. Image Specification Processing Performed by Imaging Apparatus

Figure 13:
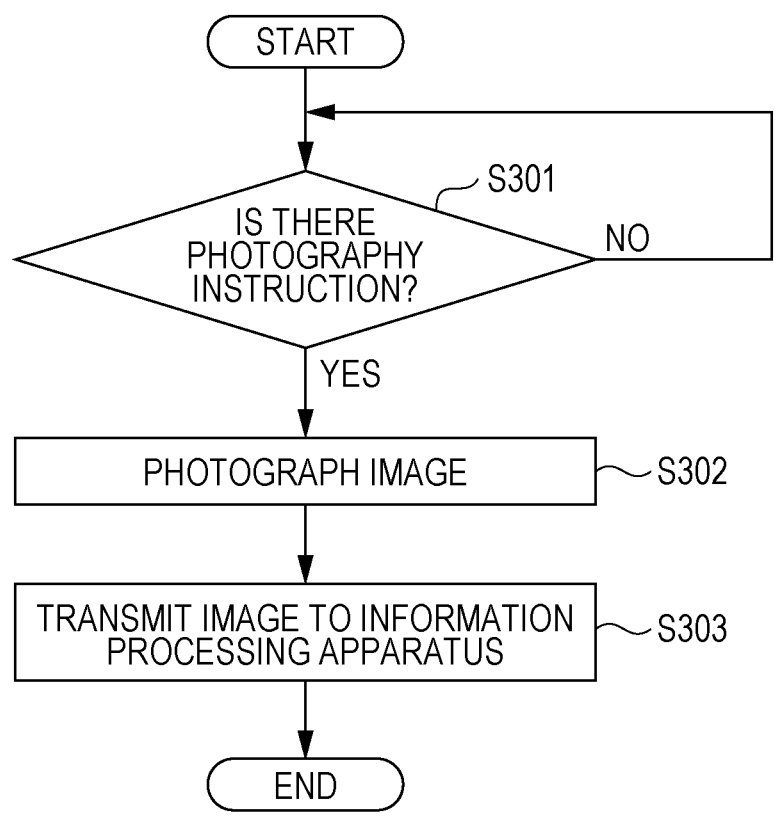
FIG. 13 is a flowchart illustrating a flow of photography processing performed by the imaging apparatus.

Next, the image specification processing, which is performed by the imaging apparatus 100 receiving the photography instruction from the information processing apparatus 200, will be described. FIG. 13 is a flowchart illustrating a flow of image specification processing performed by the imaging apparatus 100. In the first embodiment, the image specification is performed through photography in the imaging apparatus 100. When the imaging apparatus 100 is in the photography assist mode, photography is performed by the imaging apparatus 100 on the basis of the photography instruction transmitted from the information processing apparatus 200.

First, in step S301, the control section 116 determines whether or not there is the photography instruction transmitted from the information processing apparatus 200. When there is no photography instruction, the determination processing of step S301 is repeated until there is the photography instruction (No in step S301). When the photography instruction is transmitted from the information processing apparatus 200 to the imaging apparatus 100, the processing advances to step S302 (Yes in step S301). Next, in step S302, the imaging apparatus 100 automatically performs photography, thereby acquiring an image. Thereby, image generation as the image specification processing is executed.

At the time of photography, the imaging apparatus 100 matches with the photography condition. Then, in step S303, the image, which is photographed through communication of the Wi-Fi communication section 111, is transmitted from the imaging apparatus 100 to the information processing apparatus 200. The photographed image, which is transmitted from the imaging apparatus 100 to the information processing apparatus 200, is the raw image. The photography processing is performed by the imaging apparatus 100 all the time when the imaging apparatus 100 is in the photography assist mode. In such a manner, the photography processing is performed by the imaging apparatus 100 that receives the photography instruction from the information processing apparatus 200.

As described above, the processing in the first embodiment of the present technology is performed. According to the first embodiment of the present technology, by linking the imaging apparatus 100 and the information processing apparatus 200, the information processing apparatus 200 assists the imaging apparatus 100 to perform photography. For example, even in photography for which it may be generally difficult to be performed, such as photography of the panoramic image, it suffices that a user simply adjusts the imaging apparatus 100 to the image specification point displayed on the user interface. Hence, it is possible to easily perform photography.

Further, the imaging apparatus 100 is captured by the camera of the information processing apparatus 200 as a different apparatus, thereby assisting in the photography of the imaging apparatus 100. With such a configuration, it may be possible to present a new photography style, which has not existed, to a user.

2. Second Embodiment 2-1. Configuration of Imaging System

Next, a second embodiment of the present technology will described. An imaging system 20 according to a second embodiment includes an imaging apparatus 300 and an information processing apparatus 400.

In the second embodiment, a moving image is photographed by the imaging apparatus 300, and tagging is performed on a frame image, which satisfies the image specification condition, among multiple frame images constituting the moving image. Then, the tagged frame image is extracted as a still image, and is used as a raw image as a target of the image processing.

Also in the second embodiment, in a similar manner to the first embodiment, the imaging apparatus 300 is captured by the camera function of the information processing apparatus 400, and the imaging apparatus 300 is displayed on the live view displayed on the display section of the information processing apparatus 400. Then, the live view displays the user interface that shows the position, the direction, and the tilt of the imaging apparatus 300 appropriate for photography. A user captures the imaging apparatus 300, which performs photography, such that the imaging apparatus 300 is within the angle of view of the camera of the information processing apparatus 400, and moves the imaging apparatus 300 in accordance with the user interface.

2-2. Configuration of Imaging Apparatus

Figure 14:
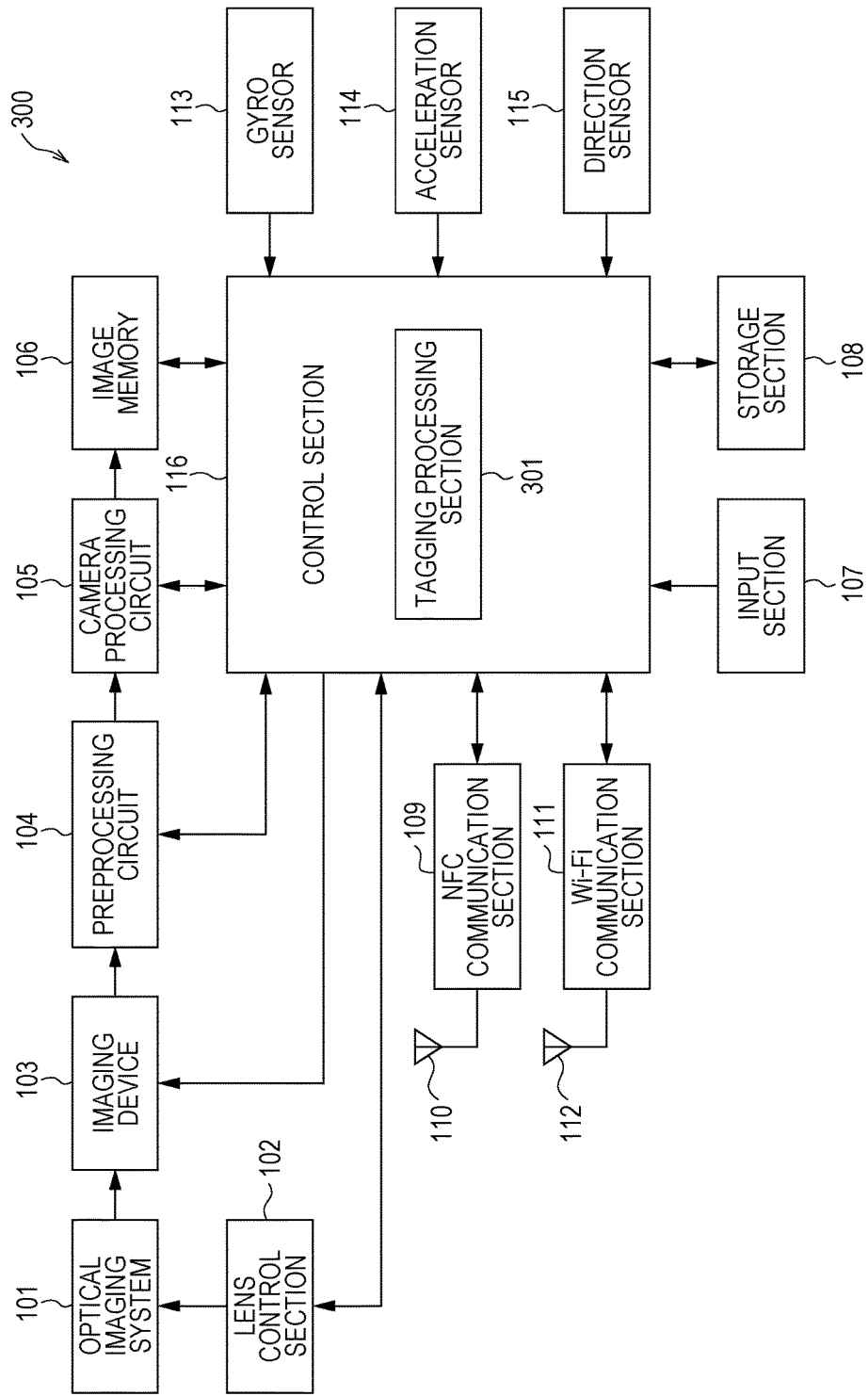
FIG. 14 is a block diagram illustrating a configuration of an imaging apparatus according to a second embodiment.

The imaging apparatus 300 constituting the imaging system 20 according to the second embodiment will be described. FIG. 14 is a block diagram illustrating a configuration of the imaging apparatus 300 according to the second embodiment. Components the same as those of the first embodiment will be represented by the reference numerals and signs, and the description thereof will be omitted. In the second embodiment, the imaging apparatus 300 is able to photograph a moving image, and records the moving image, on the basis of instructions to start recording of the moving image and stop recording of the moving image transmitted from the information processing apparatus 400.

The imaging apparatus 300 in the second embodiment includes a tagging processing section 301. The tagging processing section 301 is implemented, for example, by executing a predetermined program in the control section 116. The tagging processing section 301 adds tag data to the frame images constituting the moving image, in accordance with a tagging instruction transmitted from the information processing apparatus 400. The tag data added to the frame images is stored in the storage section 108 together with moving image data, and is transmitted to the information processing apparatus 400 through communication performed by the Wi-Fi communication section 111, at the time point the recording of the moving image ends.

In the second embodiment, the image specification is performed through tagging processing in the imaging apparatus 300. That is, a tagged frame image among the plurality of frame images constituting the moving image is specified as a raw image. The tag data added by the tagging processing section 301 is, for example, that shown in FIG. 15. In FIG. 15, the tag data includes a photography assist type, a position of the image specification point, a tagging time, and an elapsed time from the start of the recording of the moving image. However, the tag data is not limited to these contents. In addition to or instead of those, the tag data may include different information.

2-3. Configuration of Information Processing Apparatus

Next, the image processing apparatus 400 constituting the imaging system 20 according to the second embodiment will be described. FIG. 16 is a block diagram illustrating a configuration of the image processing apparatus 400 according to the second embodiment. Components the same as those of the first embodiment will be represented by the reference numerals and signs, and the description thereof will be omitted.

The image specification condition setting section 216 performs a process of setting an image specification condition, in accordance with types of the photography assist. In the second embodiment, the image specification is performed by tagging the frame images constituting the moving image. The tagged image is extracted as a still image, and is set as a raw image. Consequently, in the second embodiment, the image specification condition is set as a tagging condition. The image specification condition setting section 216 first sets a plurality of combinations of the position, the direction, and the tilt of the imaging apparatus 300, which are necessary for the imaging apparatus 300 to perform tagging, as image specification points. The image specification point is set with reference to, for example, a table in which contents of the photography assist and the image processing are associated with the position, the direction, and the tilt of the imaging apparatus 300 in advance.

Then, the image specification condition setting section 216 sets one of a plurality of image specification points as a tagging condition which is the image specification condition. The tagging condition is satisfied, and the tagging instruction is transmitted from the information processing apparatus 400 to the imaging apparatus 300. Then, when the imaging apparatus 300 performs tagging, the image specification condition setting section 216 sets a different image specification point as a subsequent tagging condition. Such setting of the tagging condition is performed on all the image specification points.

It should be noted that elements, which are set as the tagging condition, are not limited to the position, the direction, and the tilt of the imaging apparatus 300, and the tagging condition may include elements other than those. Further, the image specification point may be any one of the position, the direction, and the tilt of the imaging apparatus 300, or may be two elements of the position, the direction, and the tilt.

The image specification instruction section 218 determines whether or not the position, the direction, and the tilt of the imaging apparatus 300 detected by the object identification section 217 match with the tagging condition. Then, when the position, the direction, and the tilt of the imaging apparatus 300 match with the tagging condition, an image specification instruction to the imaging apparatus 300 is issued. The image specification in the second embodiment is performed through tagging of the imaging apparatus 300, and thus the image specification instruction is an instruction to the effect that tagging is executed in the imaging apparatus 300. The tagging instruction is transmitted to the imaging apparatus 300 through communication performed by the Wi-Fi communication section 209.

An image extraction section 401 extracts the frame image, to which the tag data is added, as a still image, with reference to the tag data attached to the moving image which is transmitted from the imaging apparatus 300. The extracted still image is supplied as the raw image to the image processing section 220.

In such a manner, the imaging system 20 according to the second embodiment is formed. It should be noted that examples of the photography assist and the image processing and the user interface are the same as those described in the first embodiment.

2-4. Processing in Imaging System 2-4-1. Transmission Processing of Sensor Information Performed by Imaging Apparatus Next, the processing performed in the imaging system 20 according to the second embodiment will be described. The processing of transmission to the information processing apparatus 400 of the sensor information performed by the imaging apparatus 300 is the same as that of the first embodiment. Hence, the flowchart of FIG. 10 will be referenced, and the description thereof will be omitted.

2-4-2. Processing in Information Processing Apparatus

Figure 17:
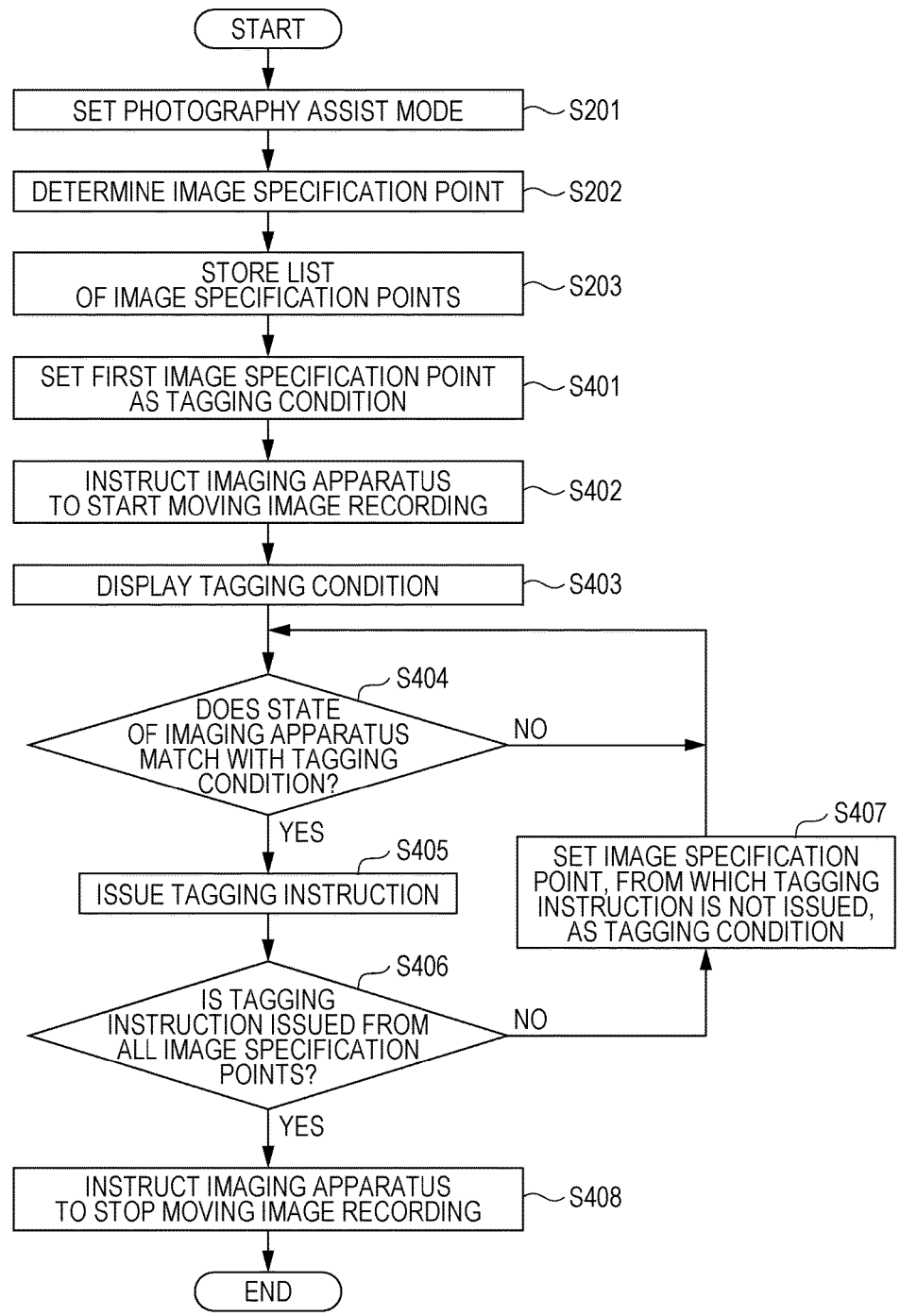
FIG. 17 is a flowchart illustrating a flow of processing performed by the information processing apparatus according to the second embodiment.

Next, the processing in the information processing apparatus 400 will be described. FIG. 17 is a flowchart illustrating a flow of processing performed by the information processing apparatus 400. It should be noted that the processing the same as that of the first embodiment is represented by the same step numbers and the detailed description will be omitted.

First, in step S201, processing of setting the photography assist mode is performed. In step S202, on the basis of the set photography assist mode, the image specification points are determined. Then, in step S203, a list of the image specification points is stored in the storage section 206, RAM, or the like.

Next, in step S401, the image specification condition setting section 216 sets any one of the plurality of existing image specification points as a tagging condition which is a target of determination performed by the image specification instruction section 218. This is a first tagging condition.

Subsequently, in step S402, the instruction to start recording of the moving image is transmitted from the information processing apparatus 400 to the imaging apparatus 300. The instruction to start recording of the moving image is transmitted to the imaging apparatus 300 through communication performed by the Wi-Fi communication section 209. In response to receiving the instruction to start recording of the moving image, the imaging apparatus 300 starts recording of the moving image.

Next, in step S403, the user interface displayed on the display section 205 presents the tagging condition to a user.

Subsequently, in step S404, the image specification instruction section 218 determines whether or not the state (all or any one of the position, the direction, and the tilt) of the imaging apparatus 300 within the angle of view of the information processing apparatus 400 matches with the image specification condition.

When the state of the imaging apparatus 300 does not match with the tagging condition, the determination processing of step S404 is repeated (No in step S404). In contrast, when the state of the imaging apparatus 300 matches with the tagging condition, the processing advances to step S405 (Yes in step S404). Then, in step S405, the image specification instruction section 218 issues the tagging instruction, and transmits the tagging instruction to the imaging apparatus 300 through communication performed by the Wi-Fi communication section 209.

Next, in step S406, whether or not the tagging instructions are issued from all the image specification points is verified. When the tagging instructions are issued from all the image specification points, the processing advances to step S407 (No in step S406).

Then, in step S407, the image specification condition setting section 216 sets the image specification point, which has not issue the tagging instruction yet, as a subsequent tagging condition. It should be noted that it is preferable to set the tagging conditions sequentially from the image specification point to the image specification point adjacent thereto, and this is the same as the photography condition in the first embodiment. By setting the tagging conditions in such a manner, a distance of movement of the imaging apparatus 300 from the image specification point to the image specification point decreases. Therefore, it is possible to promptly and easily perform the tagging. However, the setting order of the tagging conditions is not limited to this.

The processing returns to step S404 again, and steps S404 to S407 are repeated. Thereby, determination as to the newly set tagging condition is made, the tagging instructions are issued, and determination as to whether the tagging instructions are issued from all the image specification points is made.

Subsequently, in step S406, the image specification instruction section 218 verifies whether or not the tagging instructions are issued from all the image specification points. When the tagging instructions are issued from all the image specification points, the processing advances to step S408 (Yes in step S406).

Next, in step S408, the instruction to stop recording of the moving image is transmitted from the information processing apparatus 400 to the imaging apparatus 300. The instruction to stop recording of the moving image is transmitted to the imaging apparatus 300 through communication performed by the Wi-Fi communication section 209. In addition, as described later, when the imaging apparatus 300 receives the instruction to stop recording of the moving image from the information processing apparatus 400 and stops recording of the moving image, the moving image data and the tag data are transmitted to the information processing apparatus 400.

Accordingly, after the instruction to stop recording of the moving image from the information processing apparatus 400 is received and recording of the moving image is stopped, the moving image data and the tag data are transmitted to the information processing apparatus 400. The information processing apparatus 400 is able to obtain the frame image as the raw image from the moving image data with reference to the tag data. Then, the processing for the image specification in the information processing apparatus 400 ends.

Figure 18:
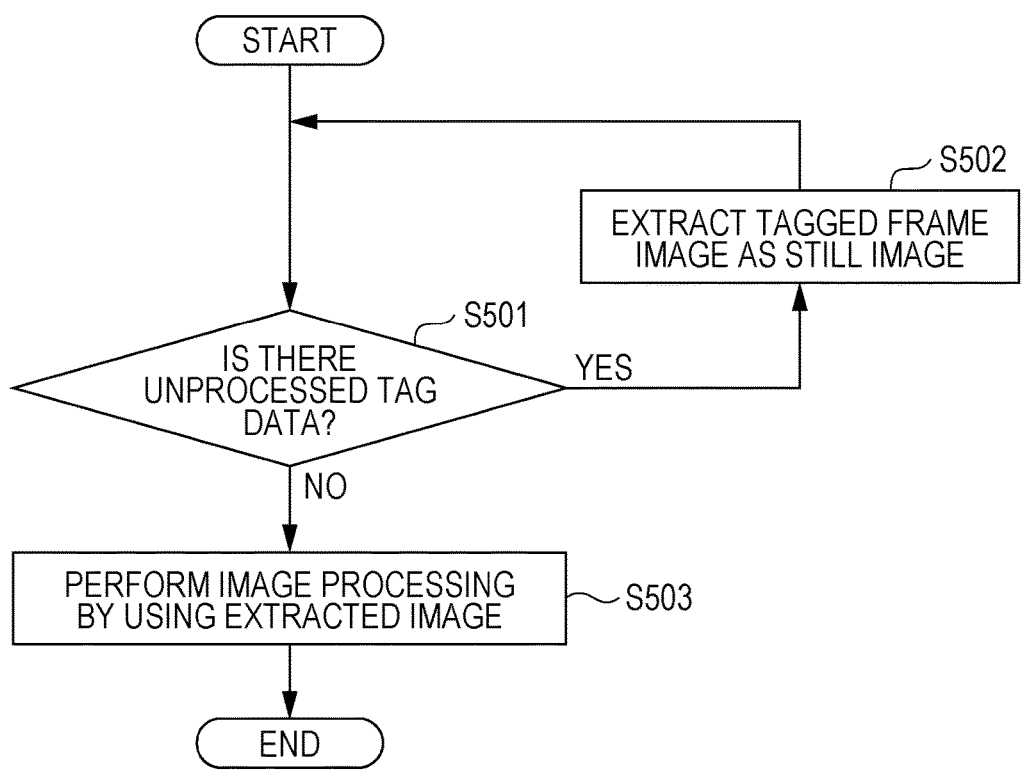
FIG. 18 is a flowchart illustrating a flow of processing performed by the information processing apparatus according to the second embodiment.

Next, processing in the information processing apparatus 400 receiving the moving image data and the tag data will be described. FIG. 18 is a flowchart illustrating a flow of the processing performed by the information processing apparatus 400.

First, in step S501, it is determined whether or not unprocessed tag data is present. When the unprocessed tag data is present, the processing advances to step S502 (Yes in step S501). Then, in step S502, the tagged frame image is extracted as a still image by the image extraction section 401. The still image is set as a raw image which is a target of the image processing. As long as the unprocessed tag data is present, steps S501 and S502 are repeated, thereby extracting the still image.

In contrast, in step S501, when it is determined that the unprocessed tag data is absent, that is, when all the tagged frame images are extracted as still images, the processing advances to step S503. Then, in step S503, by using the extracted still image, the image processing section 220 performs predetermined image processing corresponding to the photography assist mode.

It should be noted that the image processing may be performed by an apparatus different from the information processing apparatus 400. When the information processing apparatus 400 receives the moving image data and the tag data and the different apparatus performs the image processing, it is necessary to transfer the moving image data and the tag data to the apparatus different from the information processing apparatus 400. Further, the instruction to the imaging apparatus 300 may be transmitted from the information processing apparatus 400, and the moving image data and the tag data may be directly transmitted from the imaging apparatus 300 to the different apparatus that performs the image processing. Furthermore, the still image extracted as the raw image may be transferred from the information processing apparatus 400 to the different apparatus that performs the image processing.

2-4-3. Image Specification Processing Performed by Imaging Apparatus.

Next, a description will be given of processing performed by the imaging apparatus 300 that receives the tagging instruction from the information processing apparatus 400. FIG. 19 is a flowchart illustrating a flow of the processing performed by the imaging apparatus 300. This processing is performed under control of the control section 116 of the imaging apparatus 300. When the imaging apparatus 300 is in the photography assist mode, the start and stop of recording of the moving image performed by the imaging apparatus 300 and the tagging for the frame image are performed on the basis of the instruction transmitted from the information processing apparatus 400.

First, in step S601, it is determined whether or not the instruction to start recording of the moving image transmitted from the information processing apparatus 400 is present. When the instruction to start recording of the moving image is absent, the determination processing in step S601 is repeated until the instruction to start recording of the moving image is present (No in step S601). When the instruction to start recording of the moving image transmitted from the information processing apparatus 400 to the imaging apparatus 300 is present, the processing advances to step S602 (Yes in step S601). Then, in step S602, the imaging apparatus 300 starts recording of the moving image.

Next, in step S603, it is determined whether or not the tagging instruction transmitted from the information processing apparatus 400 is present. When the tagging instruction is absent, the determination processing in step S603 is repeated until the tagging instruction is present (No in step S603). When the tagging instruction transmitted from the information processing apparatus 400 is present, the processing advances to step S604 (Yes in step S603). Then, in step S604, the tagging processing section 301 performs the tagging processing on the frame images constituting the moving image. As described above, the tagging is performed on the frame images which are captured by the imaging apparatus 300 in a state where the tagging condition is satisfied.

Next, in step S605, it is determined whether or not the instruction to stop recording of the moving image transmitted from the information processing apparatus 400 is present. When the instruction to stop recording of the moving image is absent, the processing advances to step S603. Then, by repeating steps S603 to S605, the tagging processing and the determination as to whether the tagging instruction is present are performed. The tagging processing corresponds to the image specification processing. When the instruction to stop recording of the moving image transmitted from the information processing apparatus 400 is present, the processing advances from step S605 to step S606 (Yes in step S605). Then, in step S606, the imaging apparatus 300 stops recording of the moving image.

Next, in step S607, the moving image data and the tag data are transmitted to the information processing apparatus 400 through communication performed by the Wi-Fi communication section 111. Then, this processing ends.

As described above, the processing in the second embodiment of the present technology is performed. According to the second embodiment, it is possible to perform the photography assist, which is the same as that of the first embodiment, even in photography of the moving image. Further, since it is possible to generate a new image based on the moving image while photographing a moving image, it may be possible to present a new photography style, which has not existed, to a user. It should be noted that the processing performed by the imaging apparatus and the information processing apparatus in the above-mentioned first and second embodiments can be implemented by hardware or software. When processing based on software is executed, a program, in which a processing sequence is recorded, is installed and executed in a memory of the control section.

For example, the program can be recorded in a recording medium such as a hard disk or a ROM in advance. Alternatively, the program can be recorded in a recording medium such as a compact disc read only memory (CD-ROM), a digital versatile disc (DVD), or a semiconductor memory. Such a recording medium can be provided as package software. A user installs the package software in the imaging apparatus and the information processing apparatus. It should be noted that not only the program is installed in the imaging apparatus and the information processing apparatus from the above-mentioned recording medium but also a program provided as an application from the Internet can be transferred to and installed in the imaging apparatus and the information processing apparatus.

3. Modification Example

Embodiments of the present technology have hitherto been described in detail, but the present technology is not limited to the above-mentioned embodiments, and may be modified into various forms based on the technical scope of the present technology.

In the description of the first and second embodiments, the imaging apparatus, which has no display section, is just an example. However, the imaging system according to the present technology may be configured using the imaging apparatus having a display section. When the imaging apparatus has the display section, the input section may be a touch panel which is integrated with the display section. Further, in the embodiment, the NFC is used as the near field communication method, but a different communication method may be employed as long as it performs the same near field communication. Furthermore, in the embodiment, as the method of communication between the imaging apparatus and the information processing apparatus, Wi-Fi is used. However, as long as the same wireless high-speed communication can be performed, a different communication method may be employed.

The combination between the imaging apparatus 100 and the information processing apparatus 200 constituting the imaging system is not limited to combination between a digital camera and a smartphone. For example, as the imaging apparatus 100, a digital camera may be used, and as the information processing apparatus 200, a tablet terminal or a personal computer may be used. Further, as the imaging apparatus 100, a smartphone may be used, and as the information processing apparatus 200, a personal computer may be used. Furthermore, as the imaging apparatus 100, a tablet terminal may be used, and as the information processing apparatus 200, a personal computer may be used. Moreover, both of the imaging apparatus 100 and the information processing apparatus 200 may employ smartphones.

In addition, the present technology may adopt the following configurations:

(1) An information processing apparatus including:

an image specification condition setting section that sets an image specification condition for an imaging apparatus as a different apparatus; and an image specification instruction section that determines whether or not the image specification condition is satisfied by the imaging apparatus and issues an image specification instruction to the imaging apparatus when the image specification condition is satisfied.

(2) The information processing apparatus according to (1), further including:

an imaging section that receives light through an optical system and generates an image; and an object identification section that identifies an object from the image which is generated by the imaging section, in which the image specification instruction section determines whether or not the imaging apparatus identified by the object identification section matches with the image specification condition.

(3) The information processing apparatus according to (1) or (2), in which the image specification instruction section issues an instruction to cause the imaging apparatus to photograph an image as the image specification instruction.

(4) The information processing apparatus according to (1) or (2), in which the image specification instruction section issues an instruction to tag frame images constituting a moving image photographed by the imaging apparatus, as the image specification instruction.

(5) The information processing apparatus according to any one of (1) to (4), in which the image specification condition setting section sets a position of the imaging apparatus as the image specification condition.

(6) The information processing apparatus according to any one of (1) to (5), in which the image specification condition setting section sets a direction of the imaging apparatus as the image specification condition.

(7) The information processing apparatus according to any one of (1) to (6), in which the image specification condition setting section sets a tilt of the imaging apparatus as the image specification condition.

(8) The information processing apparatus according to any one of (1) to (7), further including:
a communication section that communicates with the imaging apparatus; and
an image processing section that performs predetermined image processing on the basis of images which are received from the imaging apparatus through communication of the communication section.

(9) The information processing apparatus according to any one of (1) to (8), in which the image processing section generates a panoramic image on the basis of a plurality of the images received from the imaging apparatus.

(10) The information processing apparatus according to any one of (1) to (8), in which the image processing section generates a 3D modeling image on the basis of a plurality of the images received from the imaging apparatus.

(11) The information processing apparatus according to any one of (1) to (8), in which the image processing section generates an image which has a size equal to or larger than those of received images on the basis of a plurality of the images received from the imaging apparatus.

(12) The information processing apparatus according to any one of (1) to (11), in which the image specification condition setting section determines the image specification condition on the basis of contents of the image processing performed by the image processing section.

(13) an imaging apparatus including:
an imaging section that receives light through an optical system and generates an image;
a control section that performs image specification processing on the basis of an image specification instruction which is transmitted from an information processing apparatus as a different apparatus; and
a communication section that communicates with the information processing apparatus.

(14) The imaging apparatus according to (13), in which the image specification processing is processing of generating an image through the imaging section.

(15) The imaging apparatus according to (13), in which the image specification processing is processing of tagging frame images constituting a moving image photographed by the imaging section.

(16) The imaging apparatus according to any one of (13) to (15), further including an acceleration sensor that acquires acceleration information, in which the acceleration information, which is acquired by the acceleration sensor, is transmitted to the information processing apparatus through the communication section.

(17) The imaging apparatus according to any one of (13) to (16), further including a direction sensor that acquires direction information, in which the direction information, which is acquired by the direction sensor, is transmitted to the information processing apparatus through the communication section.

(18) An information processing method including: setting an image specification condition for an imaging apparatus as a different apparatus; and determining whether or not the image specification condition is satisfied by the imaging apparatus and issuing an image specification instruction to the imaging apparatus when the image specification condition is satisfied.

(19) An information processing program causing a computer to execute an information processing method including:
setting an image specification condition for an imaging apparatus as a different apparatus; and
determining whether or not the image specification condition is satisfied by the imaging apparatus and issuing an image specification instruction to the imaging apparatus when the image specification condition is satisfied.

(20) An imaging system including:
an imaging apparatus that includes
an imaging section that receives light through an optical system and generates an image,
a control section that performs image specification processing on the basis of an image specification instruction which is transmitted from an information processing apparatus as a different apparatus, and
a communication section that communicates with the information processing apparatus; and the information processing apparatus that includes an image specification condition setting section that sets an image specification condition for the imaging apparatus as a different apparatus, and an image specification instruction section that determines whether or not the image specification condition is satisfied by the imaging apparatus and issues an image specification instruction to the imaging apparatus when the image specification condition is satisfied.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
circuitry configured to:
set an imaging condition for an imaging apparatus, wherein the set imaging condition indicates a position, a direction, and a tilt of the imaging apparatus;
capture a first image that includes the imaging apparatus;
determine a state of the imaging apparatus based on the captured first image;
display, on a display section of the information processing apparatus, the set imaging condition for the imaging apparatus;
receive a first user input to modify the state of the imaging apparatus based on the displayed set imaging condition;
sequentially set each image specification point of a plurality of image specification points as subsequent imaging conditions for the imaging apparatus, wherein each image specification point of the plurality of image specification points indicates the position, the direction, and the tilt of the imaging apparatus;
transmit, for each of the sequentially set image specification point, an image specification instruction to instruct the imaging apparatus to photograph a corresponding second image,
wherein a plurality of second images comprises the corresponding second image photographed at each image specification point of the plurality of image specification points; and process the plurality of second images, based on the corresponding image specification instruction to photograph at each image specification point of the plurality of image specification points.

2. The information processing apparatus according to claim 1, wherein the circuitry is further configured to:
receive a second user input; and
set the imaging condition for the imaging apparatus based on the received second user input.

3. The information processing apparatus according to claim 1, wherein the corresponding image specification instruction further instructs the imaging apparatus to tag frame images comprising a moving image captured by the imaging apparatus.

4. The information processing apparatus according to claim 1, wherein the circuitry is further configured to generate a panoramic image based on the plurality of second images.

5. The information processing apparatus according to claim 1, wherein the circuitry is further configured to generate a 3D modeling image based on the plurality of second images.

6. The information processing apparatus according to claim 1, wherein the circuitry is further configured to generate a third image based on the plurality of second images, and
wherein the third image has a larger size than each of the plurality of second images.

7. The information processing apparatus according to claim 1, wherein the circuitry is further configured to determine the imaging condition based on the plurality of second images.

8. An imaging apparatus, comprising:
circuitry configured to: receive, for each of a sequentially set image specification point of a plurality of image specification points, an image specification instruction to photograph a corresponding first image, wherein a plurality of first images comprises the corresponding first image photographed at each image specification point of the plurality of image specification points,
wherein each image specification point of the plurality of image specification points is sequentially set as subsequent imaging conditions for the imaging apparatus, wherein each image specification point of the plurality of image specification points indicates a position, a direction, and a tilt of the imaging apparatus; and
wherein the plurality of first images are processed, based on the corresponding image specification instruction to photograph at each image specification point of the plurality of image specification points;
generate the plurality of first images;
transmit the generated plurality of first images to an information processing apparatus,
wherein an imaging condition for the imaging apparatus is set, wherein the set imaging condition indicates the position, the direction, and the tilt of the imaging apparatus, wherein the set imaging condition is displayed on a display section of the information processing apparatus, and wherein a user input to modify a state of the imaging apparatus is received based on the displayed set imaging condition,
and wherein the state of the imaging apparatus is determined based on a second image that includes the imaging apparatus and that is captured by the information processing apparatus.

9. The imaging apparatus according to claim 8, wherein the circuitry is further configured to:

capture a moving image; and
tag frame images comprising the moving image.

10. The imaging apparatus according to claim 8, wherein the circuitry is further configured to:
acquire acceleration information of the imaging apparatus; and
transmit the acquired acceleration information to the information processing apparatus.

11. The imaging apparatus according to claim 8, wherein the circuitry is further configured to:
acquire direction information of the imaging apparatus; and
transmit the acquired direction information to the information processing apparatus.

12. An information processing method, comprising:
in an information processing apparatus:
setting an imaging condition for an imaging apparatus, wherein the set imaging condition indicates a position, a direction, and a tilt of the imaging apparatus;
capturing a first image that includes the imaging apparatus;
determining a state of the imaging apparatus based on the captured first image;
displaying, on a display section of the information processing apparatus, the set imaging condition for the imaging apparatus;
receiving a user input to modify the state of the imaging apparatus based on the displayed set imaging condition;
sequentially setting each image specification point of a plurality of image specification points as subsequent imaging conditions for the imaging apparatus, wherein each image specification point of the plurality of image specification points indicates the position, the direction, and the tilt of the imaging apparatus;
transmitting, for each of the sequentially set image specification point, an image specification instruction to instruct the imaging apparatus to photograph a corresponding second image,
wherein a plurality of second images comprises the corresponding second image photographed at each image specification point of the plurality of image specification points; and
processing the plurality of second images, based on the corresponding image specification instruction to photograph at each image specification point of the plurality of image specification points.

13. A non-transitory computer-readable medium having stored thereon computer-executable instructions, which when executed by an information processing apparatus, cause the information processing apparatus to execute operations, the operations comprising:
setting an imaging condition for an imaging apparatus, wherein the set imaging condition indicates a position, a direction, and a tilt of the imaging apparatus;
controlling capture of a first image that includes the imaging apparatus;
determining a state of the imaging apparatus based on the capture of the first image;
displaying, on a display section of the information processing apparatus, the set imaging condition for the imaging apparatus;
receiving a user input to modify the state of the imaging apparatus based on the displayed set imaging condition;
sequentially setting each image specification point of a plurality of image specification points as subsequent imaging conditions for the imaging apparatus, wherein each image specification point of the plurality of image specification points indicates the position, the direction, and the tilt of the imaging apparatus;

transmitting, for each of the sequentially set image specification point, an image specification instruction to instruct the imaging apparatus to photograph a corresponding second image, wherein a plurality of second images comprises the corresponding second image photographed at each image specification point of the plurality of image specification points; and processing the plurality of second images, based on the corresponding image specification instruction to photograph at each image specification point of the plurality of image specification points.

14. An imaging system, comprising:

an imaging apparatus that includes:

a first circuitry configured to:

receive an image specification instruction from an information processing apparatus;

generate a first image;

transmit the generated first image to the information processing apparatus; and the information processing apparatus that includes:

a second circuitry configured to:

set an imaging condition for the imaging apparatus, wherein the set imaging condition indicates a position, a direction, and a tilt of the imaging apparatus;

capture a second image that includes the imaging apparatus;

determine a state of the imaging apparatus based on the captured second image;

display, on a display section of the information processing apparatus, the set imaging condition for the imaging apparatus;

receive a user input to modify the state of the imaging apparatus based on the displayed set imaging condition;

sequentially set each image specification point of a plurality of image specification points as subsequent imaging conditions for the imaging apparatus, wherein each image specification point of the plurality of image specification points indicates the position, the direction, and the tilt of the imaging apparatus;

transmit, for each of the sequentially set image specification point, an image specification instruction to instruct the imaging apparatus to photograph the corresponding first image, wherein a plurality of first images comprises the corresponding first image photographed at each image specification point of the plurality of image specification points; and process the plurality of first images, based on the corresponding image specification instruction to photograph at each image specification point of the plurality of image specification points.

* * * * *